United States Patent
Mitchell et al.

(10) Patent No.: US 11,492,477 B2
(45) Date of Patent: Nov. 8, 2022

(54) POLYMER COMPOSITIONS AND NONWOVEN COMPOSITIONS PREPARED THEREFROM

(71) Applicant: ExxonMobil Chemical Patents Inc., Baytown, TX (US)

(72) Inventors: Cynthia A. Mitchell, Houston, TX (US); Galen C. Richeson, Humble, TX (US); Narayanaswami Dharmarajan, Houston, TX (US)

(73) Assignee: EXXONMOBIL CHEMICALS PATENT INC., Baytown, TX (US)

( * ) Notice: Subject to any disclaimer, the term of this patent is extended or adjusted under 35 U.S.C. 154(b) by 683 days.

(21) Appl. No.: 14/781,464

(22) PCT Filed: May 1, 2014

(86) PCT No.: PCT/US2014/036335
§ 371 (c)(1),
(2) Date: Sep. 30, 2015

(87) PCT Pub. No.: WO2014/197141
PCT Pub. Date: Dec. 11, 2014

(65) Prior Publication Data
US 2016/0032090 A1 Feb. 4, 2016

Related U.S. Application Data

(60) Provisional application No. 61/831,033, filed on Jun. 4, 2013.

(51) Int. Cl.
C08L 23/14 (2006.01)
D04H 1/4291 (2012.01)
D04H 1/724 (2012.01)

(52) U.S. Cl.
CPC .......... *C08L 23/14* (2013.01); *C08L 23/142* (2013.01); *D04H 1/4291* (2013.01);
(Continued)

(58) Field of Classification Search
CPC ..... C08L 23/14; C08L 23/142; D04H 1/4291; D04H 1/724
(Continued)

(56) References Cited

U.S. PATENT DOCUMENTS 3,338,992 A 8/1967 Kinney
3,341,394 A 9/1967 Kinney
(Continued)

FOREIGN PATENT DOCUMENTS

WO WO2009/064583 5/2009
WO WO2011/102946 8/2011
WO WO2013/081756 6/2013

*Primary Examiner* — Matthew D Matzek
(74) *Attorney, Agent, or Firm* — Katherine L. Jackson

(57) ABSTRACT

Described herein are propylene-based polymer compositions that comprise a reactor blend of a first polymer component and a second polymer component. The first polymer component has an ethylene content of from greater than 12 to less than 19 wt % ethylene, and the second polymer component has an ethylene content of from greater than 4 to less than 10 wt % ethylene. Preferably, the ethylene content of the first and second polymer components satisfy the formula:

$-1.7143R_1+29.771 \leq R_2 \leq -1.9167R_1+37.25$.

The propylene-based polymer compositions are particularly useful for forming meltspun nonwoven compositions that exhibit a desirable balance of retractive force and permanent set.

26 Claims, 6 Drawing Sheets

(52) U.S. Cl.
CPC .......... *D04H 1/724* (2013.01); *C08L 2203/12* (2013.01); *C08L 2205/025* (2013.01); *C08L 2308/00* (2013.01)

(58) Field of Classification Search
USPC .................. 525/240; 264/638–640; 442/400
See application file for complete search history.

(56) References Cited

U.S. PATENT DOCUMENTS

| | | |
|---|---|---|
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,340,563 A | 7/1982 | Appel et al. |
| 6,268,203 B1 | 7/2001 | Johnson et al. |
| 6,525,157 B2 | 2/2003 | Cozewith et al. |
| 6,881,800 B2 | 4/2005 | Friedersdorf |
| 7,157,522 B2 | 1/2007 | Datta et al. |
| 7,803,876 B2 | 9/2010 | Yeh et al. |
| 8,013,069 B2 | 9/2011 | Harrington et al. |
| 8,026,323 B2 | 9/2011 | Datta et al. |
| 8,765,834 B2 | 7/2014 | Jacob |
| 2002/0019507 A1 | 2/2002 | Karandinos et al. |
| 2004/0198913 A1 | 10/2004 | Datta et al. |
| 2005/0107529 A1* | 5/2005 | Datta .................... C08F 210/06 525/70 |
| 2005/0130544 A1 | 6/2005 | Cheng et al. |
| 2005/0182198 A1* | 8/2005 | Cheng .................... C08L 23/12 525/240 |
| 2008/0172840 A1 | 7/2008 | Kacker et al. |
| 2009/0124154 A1 | 5/2009 | Harrington et al. |
| 2010/0267914 A1* | 10/2010 | Westwood ............ D04H 3/007 526/348 |
| 2011/0207888 A1* | 8/2011 | Kolb .................... C08L 23/142 525/240 |
| 2012/0062517 A1 | 3/2012 | Lai et al. |
| 2012/0123374 A1 | 5/2012 | Richeson et al. |
| 2016/0032090 A1 | 2/2016 | Mitchell et al. |

* cited by examiner

POLYMER COMPOSITIONS AND NONWOVEN COMPOSITIONS PREPARED THEREFROM

CROSS REFERENCE TO RELATED APPLICATIONS

This application is a National Stage Application of International Application No. PCT/US2014/036,335, filed May 1, 2014, which claims the benefit of 61/831,033, filed Jun. 4, 2013, the disclosures of which are fully incorporated herein by reference in their entirety.

FIELD OF THE INVENTION

This invention relates to propylene-based polymer compositions, nonwoven compositions prepared therefrom, and to methods for making the same.

BACKGROUND OF THE INVENTION

Propylene-based polymers and copolymers are well known in the art for their usefulness in a variety of applications, including the manufacture of nonwoven fabrics. Such fabrics have a wide variety of uses, such as in medical and hygiene products, clothing, filter media, and sorbent products. Meltblown nonwoven fabrics are particularly useful in hygiene products, such as baby diapers, adult incontinence products, and feminine hygiene products. An important aspect of these fabrics, particularly in hygiene applications, is the ability to produce aesthetically pleasing fabrics having good leakage performance at a low cost. Good leakage performance is achieved via the elasticity of the elastic layers of the fabrics, which provides better fit and conformity to the wearer, resulting in fewer leaks. A further advantage of these fabrics is their breathability compared to film-based laminates.

Production of meltblown nonwoven fabrics using commercially available propylene-based polymers having a melt flow rate (MFR) less than 30 g/10 min in the elastic layers can be difficult, because the low MFR of such polymers requires high melt temperatures and high pressures to melt blow the fibers. High process temperatures can cause undesirable degradation in the extruder, while high pressures limit the throughput rate of the melt blowing equipment. Previously, some propylene-based polymers have been blended with an additional polymer or polymers post-reactor, often isotactic propylene homopolymers, and then visbroken with peroxide to achieve a higher MFR polymer for use in elastic layers. Blending with an additional polymer, however, typically increases manufacturing cost and reduces the elastic performance of the resulting nonwoven fabrics. Similarly, visbreaking also increases manufacturing costs and adds complexity to manufacturing processes.

It is therefore desirable to form the elastic layers of meltblown nonwoven fabrics from propylene-based polymers having a higher MFR (i.e., greater than 30 g/10 min) without blending the propylene-based polymers post-reactor with homopolypropylene or other polymers and without visbreaking the polymers. Such fabrics can be produced under broader process conditions, and at higher throughput rates and lower costs. It would also be desirable to form fabrics that exhibit a desirable balance of retractive force and permanent set.

U.S. Patent Application Publication No. 2002/0019507 describes propylene-based polymers that have been visbroken with peroxide to increase the MFR of the polymer for use in adhesive applications.

U.S. Patent Application Publication No. 2005/0130544 describes blends of propylene-based polymers with propylene homopolymers for use in fiber spinning.

U.S. Patent Application Publication No. 2008/0172840 describes polyolefin blend compositions suitable for use in spunbond fiber or filament applications having an MFR between 100 and 500 g/10 min.

U.S. Patent Application Publication No. 2009/0124154 describes nonwoven fabrics comprising two or more propylene-based elastomers and one or more propylene-based thermoplastic polymers.

International Publication No. WO 2009/064583 describes nonwoven fabrics made from compositions comprising a low crystallinity propylene-based elastomer, a high crystallinity propylene-based elastomer, and a propylene-based thermoplastic polymer.

International Application No. PCT/US2012/062517 describes propylene-based compositions that are reactor grade compositions comprising a reactor blend of a first polymer and a second polymer. The first polymer has an ethylene content of 16 wt % and the second polymer has an ethylene content of 4 wt %. The compositions may be used to form meltspun nonwoven fabrics.

BRIEF DESCRIPTION OF THE FIGURES

FIG. 2 also indicates the percent of increase or decrease in the retractive force of example fabrics compared to a control fabric.

FIG. 3 also indicates the percent of increase or decrease in the retractive force of example fabrics compared to a control fabric.

FIG. 4 also indicates the percent of increase or decrease in the retractive force of example fabrics compared to a control fabric.

FIG. 5 also indicates the percent of increase or decrease in the retractive force of example fabrics compared to a control fabric.

FIG. 6 also indicates the percent of increase or decrease in the retractive force of example fabrics compared to a control fabric.

FIG. 7 also indicates the percent of increase or decrease in the retractive force of example fabrics compared to a control fabric.

FIG. 8 also indicates the percent of increase or decrease in the retractive force of example fabrics compared to a control fabric.

FIG. 9 also indicates the percent of increase or decrease in the retractive force of example fabrics compared to a control fabric.

FIG. 10 also indicates the percent of increase or decrease in the retractive force of example fabrics compared to a control fabric.

SUMMARY OF THE INVENTION

Figure 1:
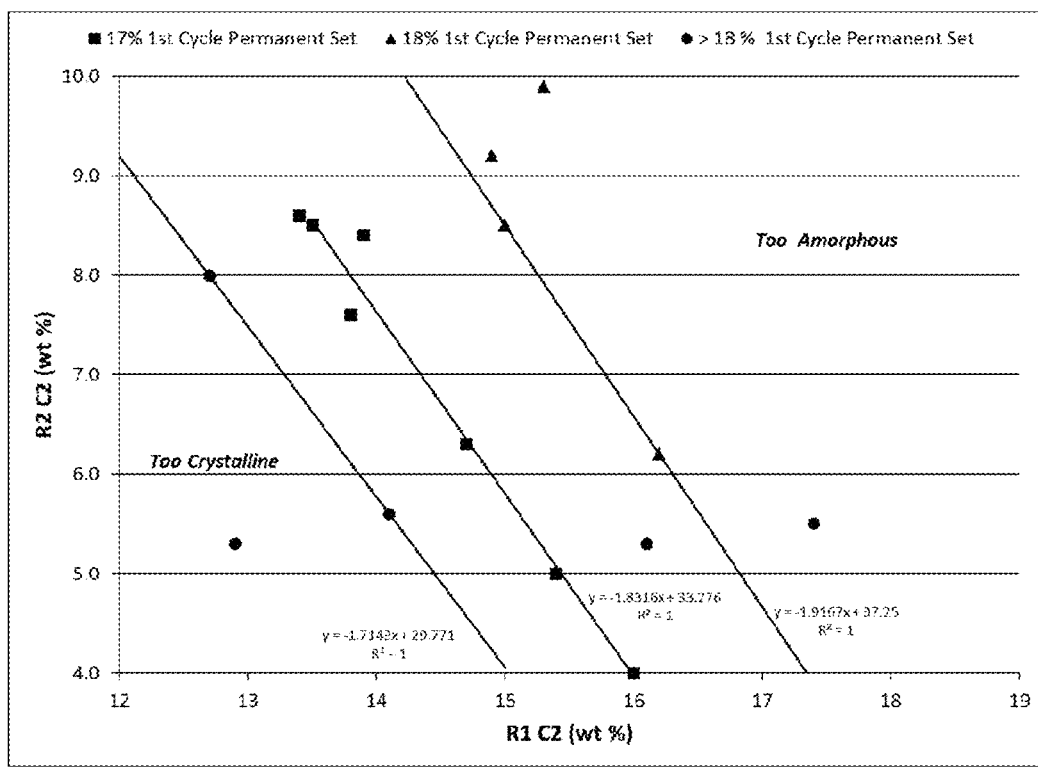
FIG. 1 illustrates the ethylene content and permanent set of fabrics of the Example 1 made with a 16" DCD and an air rate of 10 psi.

Provided are propylene-based polymer compositions that comprise a reactor blend of a first polymer component and a second polymer component. The first polymer component comprises propylene and ethylene and has an ethylene content $R_1$ of from greater than 12 to less than 19 wt % ethylene, where the percentage by weight is based upon the total weight of the propylene-derived and ethylene-derived units of the first polymer component. The second polymer component comprises propylene and ethylene and has an ethylene content $R_2$ of from greater than 4 to less than 10 wt % ethylene, where the percentage by weight is based upon the total weight of the propylene-derived and ethylene-derived units of the second polymer component. Preferably, the ethylene content of the first and second polymer components satisfy the formula:

$$-1.7143R_1+29.771 \leq R_2 \leq -1.9167R_1+37.25.$$

Also provided herein are meltspun nonwoven composition having at least one elastic layer, wherein the elastic layer comprises the propylene-based polymer composition, and methods of producing such nonwoven compositions.

DETAILED DESCRIPTION OF THE INVENTION

Disclosed herein are propylene-based polymer compositions, nonwoven fabrics having at least one elastic layer comprising those propylene-based polymer compositions, and processes for forming such fabrics. The propylene-based polymer composition comprises a reactor blend of a first polymer component and a second polymer component. The first polymer component comprises propylene and ethylene and has an ethylene content $R_1$ of from greater than 12 wt % to less than 19 wt %, based on the weight of the first polymer component. The second polymer component comprises propylene and ethylene and has an ethylene content $R_2$ of from greater than 4 wt % to less than 10 wt %, based on the weight of the second polymer component. The ethylene contents of the first and second polymer components satisfy the formula:

$$-1.7143R_1+29.771 \leq R_2 \leq -1.9167R_1+37.25.$$

As used herein, the term "copolymer" is meant to include polymers having two or more monomers, optionally with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries. The term "blend" as used herein refers to a mixture of two or more polymers.

The term "monomer" or "comonomer" as used herein can refer to the monomer used to form the polymer, i.e., the unreacted chemical compound in the form prior to polymerization, and can also refer to the monomer after it has been incorporated into the polymer, also referred to herein as a "[monomer]-derived unit", which by virtue of the polymerization reaction typically has fewer hydrogen atoms than it does prior to the polymerization reaction. Different monomers are discussed herein, including propylene monomers, ethylene monomers, and diene monomers.

"Polypropylene" as used herein includes homopolymers and copolymers of propylene or mixtures thereof. Products that include one or more propylene monomers polymerized with one or more additional monomers may be more commonly known as random copolymers (RCP) or impact copolymers (ICP). Impact copolymers are also known in the art as heterophasic copolymers. "Propylene-based," as used herein, is meant to include any polymer comprising propylene, either alone or in combination with one or more comonomers, in which propylene is the major component (i.e., greater than 50 wt % propylene).

"Reactor grade" as used herein means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide. For the purposes of this disclosure, however, reactor grade polymers include those polymers that are reactor blends.

"Reactor blend" as used herein means a highly dispersed and mechanically inseparable blend of two or more polymers produced in situ as the result of sequential (e.g., series) or parallel polymerization of one or more monomers with the formation of one polymer in the presence of another, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers comprising a blend of two or more polymers in which the polymers are blended ex situ, such as by physically or mechanically blending in a mixer, extruder, or other similar device.

"Visbreaking" as used herein is a process for reducing the molecular weight of a polymer by subjecting the polymer to chain scission. The visbreaking process also increases the MFR of a polymer and may narrow its molecular weight distribution. Several different types of chemical reactions can be employed for visbreaking propylene-based polymers. An example is thermal pyrolysis, which is accomplished by exposing a polymer to high temperatures, e.g., in an extruder at 350° C. or higher. Other approaches are exposure to powerful oxidizing agents and exposure to ionizing radiation. The most commonly used method of visbreaking is the addition of a prodegradant to the polymer. A prodegradant is a substance that promotes chain scission when mixed with a polymer, which is then heated under extrusion conditions. Examples of prodegradants used in commercial practice are alkyl hydroperoxides and dialkyl peroxides. These materials, at elevated temperatures, initiate a free radical chain reaction resulting in scission of polypropylene molecules.

The terms "prodegradant" and "visbreaking agent" are used interchangeably herein. Polymers that have undergone chain scission via a visbreaking process are said herein to be "visbroken." Such visbroken polymer grades, particularly polypropylene grades, are often referred to in the industry as "controlled rheology" or "CR" grades.

"Catalyst system" as used herein means the combination of one or more catalysts with one or more activators and, optionally, one or more support compositions. An "activator" is any compound or component, or combination of compounds or components, capable of enhancing the ability of one or more catalysts to polymerize monomers to polymers.

Propylene-Based Polymer Compositions

The propylene-based polymer compositions are reactor grade polymer compositions that comprise a reactor blend of a first polymer component and a second polymer component. The polymer compositions described herein are particularly suitable for use in the elastic layers of meltblown nonwoven fabrics, as well as in other applications.

The propylene-based polymer compositions comprise propylene and from about 5 wt % to about 22 wt % of one or more comonomers selected from ethylene and/or $C_4$-$C_{12}$ α-olefins. The α-olefin comonomer units may derive from ethylene, butene, pentene, hexene, 4-methyl-1-pentene, octene, or decene. In preferred embodiments the α-olefin is ethylene. In some embodiments, the propylene-based polymer composition consists essentially of propylene and ethylene, or consists only of propylene and ethylene.

The propylene-based polymer composition may include at least about 5 wt %, at least about 6 wt %, at least about 7 wt %, or at least about 8 wt %, or at least about 10 wt %, or at least about 12 wt %, or at least 14 wt % ethylene-derived units, where the percentage by weight is based upon the total weight of the propylene-derived and alpha-olefin derived units. The propylene-based polymer composition may include up to about 22 wt %, or up to about 20 wt %, or up to about 19 wt %, or up to about 18 wt %, or up to about 17 wt % ethylene-derived units, where the percentage by weight is based upon the total weight of the propylene-derived and alpha-olefin derived units. In some embodiments, the propylene-based polymer composition may desirably comprise from about 5 wt % to about 22 wt % ethylene, or from about 7 wt % to about 20 wt % ethylene, or from about 10 wt % to about 19 wt % ethylene, or from about 12 wt % to about 18 wt % ethylene, or from about 12 wt % to about 15 wt % ethylene, where the percentage by weight is based upon the total weight of the propylene-derived and alpha-olefin derived units.

The propylene-based polymer composition may include at least about 78 wt %, or at least about 80 wt %, or at least about 81 wt %, or at least about 82 wt %, or at least about 83 wt %, or at least about 84 wt % propylene-derived units, or at least about 85 wt % propylene-derived units, where the percentage by weight is based upon the total weight of the propylene-derived and alpha-olefin derived units. The propylene-based polymer composition may include at up to about 95 wt %, or up to about 94 wt %, or up to about 93 wt %, or up to about 92 wt %, or up to about 90 wt %, or up to about 88 wt %, or up to about 86 wt % of propylene-derived units, where the percentage by weight is based upon the total weight of the propylene-derived and alpha-olefin derived units.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157, whose test methods are also fully applicable for the various measurements referred to in this specification and claims and which contains more details on GPC measurements, the determination of ethylene content by NMR and the DSC measurements.

The propylene-based polymer compositions may be characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak. The Tm of the propylene-based polymer compositions (as determined by DSC) may be less than about 115° C., or less than about 110° C., or less than 105° C., or less than about 100° C., or less than about 90° C., or less than 80° C., or less than 70° C. The Tm of the propylene-based polymer composition may be greater than 10° C., or greater than 15° C., or greater than 20° C., or greater than 25° C., or greater than 30° C., or greater than 35° C., or greater than 40° C., or greater than 45° C., or greater than 50° C. In some embodiments, the Tm of the propylene-based composition may be in the range of from 10 to 115° C., or in the range of from 25 to 90° C., or in the range of 30 to 80° C., or in the range of 40 to 70° C., or in the range of 50 to 70° C.

In some embodiments, the propylene-based polymer composition exhibits a single melting peak. Thus, even though the propylene-based polymer composition is a reactor blend of a first and second polymer component, the blends are inseparable and exhibit a single melting peak as measured by DSC.

The propylene-based polymer composition may be characterized by a heat of fusion (Hf), as determined by DSC. The propylene-based polymer composition may have an Hf that is at least about 0.5 J/g, or at least about 1.0 J/g, or at least about 1.5 J/g, or at least about 3.0 J/g, or at least about 4.0 J/g, or at least about 6.0 J/g, or at least about 7.0 J/g. In some embodiments, the propylene-based polymer compositions may be characterized by an Hf of less than about 75 J/g, or less than about 70 J/g, or less than about 60 J/g, or less than about 50 J/g, or less than about 30 J/g, or less than 20 J/g, or less than 15 J/g. In some embodiments, the propylene-based polymer composition has a Hf that is in the range 1 to 75 J/g, or from 3 to 60 J/g, or from 5 to 40 J/g, or from 10 to 30 J/g, or from 15 to 20 J/g.

As used within this specification, DSC procedures for determining Tm and Hf include the following. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is then heated at 10° C./min to attain a final temperature of about 200° C. The sample is kept at 200° C. for 5 to 10 minutes. Then a second cool-heat cycle is performed. Events from both cycles are recorded. The thermal output is a measure of the Hf of the polymer and is recorded as the area under the melting peak of the sample, which typically occurs between about 0° C. and about 200° C., and is measured in Joules.

The propylene-based polymer composition can have a triad tacticity of three propylene units (mmm tacticity), as measured by $^{13}$C NMR, of 75% or greater, 80% or greater, 85% or greater, 90% or greater, 92% or greater, 95% or greater, or 97% or greater. In some embodiments, the triad tacticity of three propylene units may range from about 75% to about 99%, or from about 80% to about 99%, or from about 85% to about 99%, or from about 90% to about 99%, of from about 80% to about 97%. Triad tacticity is determined by the methods described in U.S. Patent Application Publication No. 2004/0236042.

The propylene-based polymer composition may have a tacticity index m/r ranging from a lower limit of 4 or 6 to an upper limit of 8 or 10 or 12. The tacticity index, expressed herein as "m/r", is determined by $^{13}$C nuclear magnetic resonance ("NMR"). The tacticity index m/r is calculated as defined by H. N. Cheng in MACROMOLECULES, 1984, Vol. 17, pp. 1950-1955, incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50.

The propylene-based polymer composition may have a percent crystallinity of from about 0.5% to about 40%, or from about 1% to about 30%, or from about 5% to about 25%, determined according to DSC procedures. Crystallinity may be determined by dividing the $H_f$ of a sample by the $H_f$ of a 100% crystalline polymer, which is assumed to be 189 J/g for isotactic polypropylene or 350 J/g for polyethylene.

The propylene-based polymer composition may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature as measured per ASTM D-792.

The propylene-based polymer composition can have a melt index (MI) (ASTM D-1238, 2.16 kg @ 190° C.) of greater than or equal to about 10 g/10 min, or greater than or equal to about 20 g/10 min, or greater than or equal to about 25 g/10 min, or greater than or equal to about 30 g/10 min.

The propylene-based polymer composition can have a melt flow rate (MFR), as measured according to ASTM D-1238, 2.16 kg weight @ 230° C., of greater than about 30 g/10 min, or greater than about 33 g/10 min, or greater than about 35 g/10 min, or greater than about 37 g/10 min, or greater than about 40 g/10 min, or greater than about 42 g/10 min, or greater than about 45 g/10 min, or greater than about 47 g/10 min, or greater than about 50 g/10 min, or greater than about 60 g/10 min, or greater than about 80 g/10 min, or greater than 100 g/10 min, or greater than about 200 g/10 min. The propylene-based polymer composition may have an MFR in the range of from 30 to 200 g/10 min, or from 20 to 100 g/10 min, or from 30 to 80 g/10 min, or from 33 to 70 g/10 min, or from 35 to 65 g/10 min, or from 40 to 60 g/10 min. The above-mentioned MFRs are the MFR of the reactor grade propylene-based polymer composition. That is, the polymers have a MFR greater than 30 g/10 min (or an MFR as indicated above) as produced in the polymerization reactor, and are not treated with peroxide or blended with another polymer to increase the MFR after exiting the reactor.

The propylene-based polymer composition may have a g' index value of at least 0.95, or at least 0.97, or at least 0.99, where g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the polymer and $\eta_l$ is the intrinsic viscosity of a linear polymer of the same viscosity-averaged molecular weight ($M_v$) as the polymer. $\eta_l = KM_v^\alpha$, K and α are measured values for linear polymers and should be obtained on the same instrument as the one used for the g' index measurement.

The propylene-based polymer composition can have a weight average molecular weight (Mw) of from about 5,000 to about 1,000,000 g/mole, or from about 10,000 to about 500,000 g/mole, or from about 20,000 to about 400,000 g/mole, or from about 50,000 to about 300,000 g/mole, or from 75,000 to 200,000 g/mole, or from 100,000 to 150,000 g/mole, or from 110,000 to 140,000 g/mole, or from 115,000 to 130,000 g/mole.

The propylene-based polymer composition can have a number average molecular weight (Mn) of from about 2,500 to about 2,500,000 g/mole, or from about 5,000 to about 500,000 g/mole, or from about 10,000 to about 250,000 g/mole, or from about 25,000 to about 200,000 g/mole, or from 30,000 to 100,000 g/mole, or from 40,000 to 65,000 g/mole.

The propylene-based polymer composition can have a Z-average molecular weight (Mz) of from about 10,000 to about 7,000,000 g/mole, or from about 50,000 to about 1,000,000 g/mole, or from about 80,000 to about 700,000 g/mole, or from about 100,000 to about 500,000 g/mole, or from 125,000 to 400,000 g/mole, or from 150,000 to 300,000 g/mole, or from 175,000 to 250,000 g/mole.

The molecular weight distribution (MWD=(Mw/Mn)) of the propylene-based polymer composition may be from about 1 to about 40, or from about 1 to about 15, or from about 1.8 to about 5, or from about 1.8 to about 3, or from about 2.0 to 2.5.

Techniques for determining the molecular weight (Mn, Mw and Mz) and MWD may be found in U.S. Pat. No. 4,540,753 and references cited therein and in Macromolecules, 1988, Vol. 21, pp. 3360-3371 (Ver Strate et al.) and references cited therein. For example, molecular weight may be determined by size exclusion chromatography (SEC) by using a Waters 150 gel permeation chromatograph equipped with the differential refractive index detector and calibrated using polystyrene standards.

Optionally, the propylene-based polymer composition may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). Exemplary dienes include, but are not limited to, butadiene, pentadiene, hexadiene (e.g., 1,4-hexadiene), heptadiene (e.g., 1,6-heptadiene), octadiene (e.g., 1,6-octadiene, or 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Mw) of less than 1000 g/mol. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyltetrahydroindene; dicyclopentadiene; bicyclo(2.2.1)hepta-2,5-diene; and alkenyl-, alkylidene-, cycloalkenyl-, and cylcoalkylidene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinylcyclooctene, 4-vinylcyclohexene, allyl cyclodecene, vinylcyclododecene, and tetracyclododecadiene. In some embodiments of the present invention, the diene is selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the propylene-based polymer composition comprises a diene, the diene may be present at from 0.05 wt % to about 6 wt % diene-derived units, or from about 0.1 wt % to about 5.0 wt % diene-derived units, or from about 0.25 wt % to about 3.0 wt % diene-derived units, or from about 0.5 wt % to about 1.5 wt % diene-derived units, where the percentage by weight is based upon the total weight of the propylene-derived, alpha-olefin derived, and diene-derived units.

The propylene-based polymer compositions are a reactor blend of a first polymer component and a second polymer component. Thus, the comonomer content of the propylene-based polymer composition can be adjusted by adjusting the comonomer content of the first polymer component, adjusting the comonomer content of second polymer component, and/or adjusting the ratio of the first polymer component to the second polymer component present in the propylene-based polymer composition. In some embodiments, the first or second polymer component is a random copolymer, preferably a random copolymer of propylene and ethylene, with the other polymer component being a propylene-based elastomer comprising propylene and ethylene.

The first polymer component comprises propylene and ethylene. The ethylene content of the first polymer component ("$R_1$") may be greater than 12 wt % ethylene, or greater than 12.1 wt % ethylene, or greater than 12.2 wt % ethylene, or greater than 12.4 wt % ethylene, or greater than 12.5 wt % ethylene, or greater than 12.6 wt % ethylene, or greater than 12.7 wt % ethylene, or greater than 12.8 wt % ethylene, or greater than 12.9 wt % ethylene, or greater than 13 wt % ethylene, or greater than 13.1 wt % ethylene, or greater than 13.2 wt % ethylene, where the percentage by weight is based upon the total weight of the propylene-derived and ethylene-derived units of the first polymer component. The ethylene content of the first polymer component may be less than 19 wt % ethylene, or less than 18.6 wt % ethylene, or less than 18.4 wt % ethylene, or less than 18 wt % ethylene, or less than 17.6 wt % ethylene, or less than 17.4 wt % ethylene, or less than 17 wt % ethylene, or less than 16.8 wt % ethylene, or less than 16.6 wt % ethylene, or less than 16.4 wt % ethylene, or less than 16.2 wt % ethylene, or less than 16 wt % ethylene, or less than 15.8 wt % ethylene, or less than 15.6 wt % ethylene, or less than 15.4 wt % ethylene, or less than 15.2 wt % ethylene, or less than 15 wt % ethylene, or less than 14.8 wt % ethylene, or less than 14.5 wt % ethylene, where the percentage by weight is based upon the total weight of the propylene-derived and ethylene-derived units of the first polymer component. In some embodiments, the ethylene content of the first polymer component may range from greater than 12 wt % to less than 19 wt % ethylene, or from 12.1 wt % to 18.6 wt %, or from 12.2 wt % to 18.4 wt %, or from 12.3 wt % to 18 wt % ethylene, or from 12.4 wt % to 17.6 wt %, or from 12.5 wt % to 17.4 wt %, or from 12.5 wt % to 17 wt % ethylene, or from 12.6 wt % to 17 wt % ethylene, or from 12.6 wt % to 16.4 wt %, or from 12.6 wt % to 15.4 wt %, or from 12.6 wt % to 15.2 wt %, or from 12.7 wt % to 15 wt % ethylene, or from 12.8 wt % to 14.8 wt % ethylene, or from 13 wt % to 14.8 wt % ethylene.

The second polymer component comprises propylene and ethylene. The ethylene content of the second polymer component ("$R_2$") may be greater than 4 wt % ethylene, or greater than 4.1 wt % ethylene, or greater than 4.2 wt % ethylene, or greater than 4.3 wt % ethylene, or greater than 4.4 wt % ethylene, or greater than 4.6 wt % ethylene, or greater than 4.8 wt % ethylene, or greater than 5 wt % ethylene, or greater than 5.2 wt % ethylene, or greater than 5.5 wt % ethylene, or greater than 5.7 wt % ethylene, or greater than 6 wt % ethylene, or greater than 6.2 wt % ethylene, or greater than 6.4 wt % ethylene, or greater than 6.8 wt % ethylene, or greater than 7 wt % ethylene, or greater than 7.2 wt % ethylene, or greater than 7.4 wt % ethylene, where the percentage by weight is based upon the total weight of the propylene-derived and ethylene-derived units of the second polymer component. The ethylene content of the second polymer component may be less than 10 wt % ethylene, or less than 9.9 wt % ethylene, or less than 9.8 wt % ethylene, or less than 9.7 wt % ethylene, or less than 9.6 wt % ethylene, or less than 9.5 wt % ethylene, or less than 9.4 wt % ethylene, or less than 9.3 wt % ethylene, or less than 9.2 wt % ethylene, or less than 9.1 wt % ethylene, or less than 9.0 wt % ethylene, where the percentage by weight is based upon the total weight of the propylene-derived and ethylene-derived units of the second polymer component. In some embodiments, the ethylene content of the second polymer component may range from greater than 4 wt % to less than 10 wt % ethylene, or from 4.4 wt % to 9.9 wt % ethylene, or from 5.0 wt % to 9.8 wt % ethylene, or from 6.0 wt % to 9.7 wt % ethylene, or from 6.4 wt % to 9.7 wt % ethylene, or from 6.6 wt % to 9.6 wt % ethylene, or from 6.8 wt % to 9.6 wt % ethylene, or from 7.0 wt % to 9.4 wt % ethylene, or from 7.2 wt % to 9.4 wt % ethylene, or from 7.4 wt % to 9.4 wt % ethylene.

In the propylene-based polymer composition, the ethylene content of the first polymer component may vary with the ethylene content of the second polymer component. Thus, the ethylene content of the first polymer component ($R_1$) may vary with the ethylene content of the second polymer component ($R_2$), such that the ethylene contents satisfy the following relationship where $R_2$ is greater than or equal to $-1.7143R_1+29.771$; or where $R_2$ is greater than or equal to $-1.7143R_1+30$; or where $R_2$ is greater than or equal to $-1.7143R_1+30.2$; or where $R_2$ is greater than or equal to $-1.7143R_1+30.4$; or where $R_2$ is greater than or equal to $-1.7143R_1+30.6$; or where $R_2$ is greater than or equal to $-1.7143R_1+30.8$; or where $R_2$ is greater than or equal to $-1.7143R_1+31$; or where $R_2$ is greater than or equal to $-1.7143R_1+31.2$; or where $R_2$ is greater than or equal to $-1.7143R_1+31.4$; or where $R_2$ is greater than or equal to $-1.7143R_1+31.6$; or where $R_2$ is greater than or equal to $-1.7143R_1+31.8$; or where $R_2$ is greater than or equal to $-1.7143R_1+32$.

The ethylene content of the first polymer component ($R_1$) may vary with the ethylene content of the second polymer component ($R_2$), such that the ethylene contents satisfy the following relationship where $R_2$ is less than or equal to $-1.9167R_1+37$; or where $R_2$ is less than or equal to $-1.9167R_1+36.8$; or where $R_2$ is less than or equal to $-1.9167R_1+36.6$; or where $R_2$ is less than or equal to $-1.9167R_1+36.4$; or where $R_2$ is less than or equal to $-1.9167R_1+36.2$; or where $R_2$ is less than or equal to $-1.9167R_1+36$; or where $R_2$ is less than or equal to $-1.9167R_1+35.8$; or where $R_2$ is less than or equal to $-1.9167R_1+35.6$; or where $R_2$ is less than or equal to $-1.9167R_1+35.4$; or where $R_2$ is less than or equal to $-1.9167R_1+35.2$; or where $R_2$ is less than or equal to $-1.9167R_1+35$.

The ethylene content of the first polymer component ($R_1$) may vary with the ethylene content of the second polymer component ($R_2$), such that the ethylene contents satisfy the following formula $-1.7143R_1+30 \leq R_2 \leq -1.9167R_1+37$; or $-1.7143R_1+31 \leq R_2 \leq -1.9167R_1+36$; or $-1.7143R_1+32 \leq R_2 \leq -1.9167R_1+35$.

In some embodiments the ethylene content of the first polymer component ($R_1$) may vary with the ethylene content of the second polymer component ($R_2$), such that the ethylene contents satisfy the following relationship where $R_2$ is greater than or equal $-1.7624R_1+32.1851$; or where $R_2$ is greater than or equal $-1.7624R_1+34.0341$. The ethylene content of the first polymer component ($R_1$) may vary with the ethylene content of the second polymer component ($R_2$), such that the ethylene contents satisfy the following relationship or where $R_2$ is less than or equal to $-1.877R_1+32.1851$; or where $R_2$ is less than or equal $-1.877R_1+34.0341$.

The MFR of the first polymer component may be the same or different from the MFR of the second polymer component.

The propylene-based polymer composition may comprise from 3-25 wt % of the second polymer component, or from 5-20 wt % of the second polymer component, or from 7-18 wt % of the second polymer component, or from 10-15 wt % of the second polymer component, based on the weight of the propylene-based polymer composition. The propylene-based polymer composition may comprise from 75 to 97 wt % of the first polymer component, or from 80 to 95 wt % of the first polymer component, or from 82 to 93 wt % of the first polymer component, or from 85 to 90 wt % of the first polymer component, based on the weight of the propylene-based polymer composition.

Preparation of the Propylene-Based Polymer Compositions

The propylene-based polymer compositions are reactor blends comprising a first polymer component and a second polymer component. The polymer compositions may be produced by any reactor blend method currently known in the art. The reactor blends may be produced in a single reactor, a series of reactors, or parallel reactors and are reactor grade blends. In some embodiments, substantially no additional homopolymers or copolymers of propylene are added to the compositions after the compositions exit the reactor. Further details may be found in U.S. Pat. Nos. 6,881,800; 7,803,876; 8,013,069; and 8,026,323.

Polymerization of the propylene-based polymer composition is typically conducted by reacting monomers in the presence of a catalyst system at a temperature of from 0° C. to 200° C. for a time of from 1 second to 10 hours. Preferably, homogeneous conditions are used, such as a continuous solution process or a bulk polymerization process with excess monomer used as diluent. The continuous process may use some form of agitation to reduce concentration differences in the reactor and maintain steady state polymerization conditions.

The propylene-based polymer compositions described herein are prepared using one or more catalyst systems. Catalyst systems suitable for use herein comprise at least a transition metal compound, also referred to as catalyst precursor, and an activator, and optionally a support composition. Contacting the transition metal compound (catalyst precursor) and the activator in solution upstream of the polymerization reactor or in the polymerization reactor yields the catalytically active component (catalyst) of the catalyst system. Such catalyst systems may optionally include impurity scavengers.

In some embodiments, the first and second polymer components are prepared with the same catalyst system. As used herein, prepared with the "same catalyst system" means that the referenced polymer components are prepared using the same combination of a transition metal compound (catalyst precursor) and an activator. In other words, the "same catalyst system" requires only that the identity of the transition metal compound and activator combination be the same; it does not require, for example, that the same amounts of the transition metal compound (or the activator) be used to form the referenced polymers, nor does it require that the transition metal compound (or the activator) be used in the same polymerizing conditions to form the referenced polymer components.

The catalyst systems used for producing the propylene-based polymer compositions comprise a metallocene compound. In some embodiments, the metallocene compound is a bridged bisindenyl metallocene having the general formula $(In^1)Y(In^2)MX_2$, where $In^1$ and $In^2$ are (preferably identical) substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl. Exemplary metallocene compounds include, but are not limited to, μ-dimethyl-silylbis(indenyl)hafniumdimethyl and μ-dimethylsilylbis(indenyl)zirconiumdimethyl, and in particular (μ-dimethyl-silyl)bis(2-methyl-4-(3,'5'-di-tert-butylphenyl)indenyl)zirconiumdimethyl, (μ-dimethyl-silyl)bis(2-methyl-4-(3,'5'-di-tert-butylphenyl)indenyl)hafnium-dimethyl, (μ-dimethyl-silyl)bis(2-methyl-4-naphthylindenyl)zirconiumdimethyl, (μ-dimethylsilyl)bis(2-methyl-4-naphthylindenyl)hafniumdimethyl, (μ-dimethylsilyl)bis(2-methyl-4-(N-carbazyl)indenyl)-zirconiumdimethyl, and (μ-dimethylsilyl)bis(2-methyl-4-(N-carbazyl)indenyl)-hafniumdimethyl.

Alternatively, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)-hafnium dimethyl, diphenylsilyl bis (5,5,8,8-tetramethyl-5,6,7,8-tetrahydrobenz(f)indenyl)-hafnium dimethyl, diphenylsilyl bis(2-(methyl)-5,5,8,8-tetramethyl-5,6,7,8-tetrahydrobenz(f)indenyl)zirconium dichloride, and cyclo-propylsilyl bis(2-(methyl)-5,5,8,8-tetramethyl-5,6,7,8-tetrahydrobenz(f)indenyl)hafnium dimethyl.

The activators of the catalyst systems used to produce propylene-based polymer compositions comprise a cationic component. In some embodiments, the cationic component has the formula $[R^1R^2R^3AH]^+$, where A is nitrogen, $R^1$ and $R^2$ are together a —$(CH_2)_a$— group, where a is 3, 4, 5 or 6 and form, together with the nitrogen atom, a 4-, 5-, 6- or 7-membered non-aromatic ring to which, via adjacent ring carbon atoms, optionally one or more aromatic or heteroaromatic rings may be fused, and $R^3$ is $C_1$, $C_2$, $C_3$, $C_4$ or $C_5$ alkyl, or N-methylpyrrolidinium or N-methylpiperidinium. In other embodiments, the cationic component has the formula $[R_nAH]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

In one or more embodiments, the activators of the catalyst systems used to produce the propylene-based polymer compositions comprise an anionic component, $[Y]^-$. In some embodiments, the anionic component is a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. In one or more embodiments, the substituents are perhalogenated aryl groups, or perfluorinated aryl groups, including but not limited to perfluorophenyl, perfluoronaphthyl and perfluorobiphenyl.

Together, the cationic and anionic components of the catalysts systems described herein form an activator compound. In one or more embodiments of the present invention, the activator may be N,N-dimethylanilinium-tetra(perfluorophenyl)borate, N,N-dimethylanilinium-tetra (perfluoronaphthyl)borate, N,N-dimethylanilinium-tetrakis (perfluorobiphenyl)borate, N,N-dimethylanilinium-tetrakis (3,5-bis(trifluoromethyl)phenyl)borate, triphenylcarbenium-tetra(perfluorophenyl)borate, triphenylcarbenium-tetra (perfluoronaphthyl)borate, triphenylcarbenium-tetrakis (perfluorobiphenyl)borate, or triphenylcarbenium-tetrakis(3, 5-bis(trifluoromethyl)phenyl)borate.

The propylene-based polymer composition may be made using any catalyst system resulting from any combination of a metallocene compound, a cationic activator component, and an anionic activator component mentioned in the preceding paragraphs. Also, combinations of two different activators can be used with the same or different metallocene (s).

Further, the catalyst system may contain, in addition to the transition metal compound and the activator, additional activators (co-activators) and/or scavengers. A co-activator is a compound capable of reacting with the transition metal complex, such that when used in combination with an activator, an active catalyst is formed. Co-activators include alumoxanes and aluminum alkyls.

In some embodiments, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$) and the like. Exemplary aluminum alkyls include triethylaluminum, diethylaluminum chloride, ethylaluminum dichloride, tri-iso-butylaluminum, tri-n-octylaluminum, tri-n-hexylaluminum, trimethylaluminum and combinations thereof. Exemplary boron alkyls include triethylboron. Scavenging compounds may also be alumoxanes and modified alumoxanes including methylalumoxane and modified methylalumoxane.

Meltspun Nonwoven Compositions

The propylene-based polymer compositions described herein are particularly useful in meltspun (e.g., meltblown or spunbond) nonwoven compositions (e.g., fabrics). In particular, the meltspun nonwoven composition may comprise at least one elastic layer, wherein the elastic layer comprises a propylene-based polymer composition. As used herein "meltspun nonwoven composition" refers to a composition having at least one meltspun layer, and does not require that the entire composition be meltspun or nonwoven. In some embodiments, the nonwoven fabrics additionally comprise one or more facing layers positioned on one or both sides of the elastic layer(s). As used herein, "nonwoven" refers to a textile material that has been produced by methods other than weaving. For example, with nonwoven fabrics, the fibers may be processed directly into a planar sheet-like fabric structure and then are either bonded chemically, thermally, or interlocked mechanically (or both) to achieve a cohesive fabric.

The present invention is directed not only to nonwoven compositions such as fabrics, but also to processes for forming nonwoven compositions comprising the polymers described herein. The method may comprise the steps of forming a molten polymer composition comprising a propylene-based polymer composition, forming fibers comprising the propylene-based polymer, and forming an elastic nonwoven layer from the fibers. The process may further comprise the steps of forming one or more nonwoven facing layers, and disposing the elastic layer or layers upon the facing layer. Optionally, one or more facing layers may additionally be disposed upon the elastic layer or layers, such that the elastic layers are sandwiched between the facing layers.

Nonwoven fabrics of the present invention can be formed by any method known in the art. For example, the nonwoven fabrics may be produced by a meltblown or spunbond process. In certain embodiments herein, the elastic layer or layers of the fabrics of the invention are produced by a meltblown process. When the fabrics further comprise one or more facing layers, the facing layers may also be produced by a meltblown process, by a spunbond or spunlace process, or by any other suitable nonwoven process.

The elastic layer or layers of the nonwoven fabrics described herein may be composed primarily of one or more propylene-based polymer compositions. While the elastic layers may comprise additives and/or fillers in addition to the propylene-based polymer compositions (which are reactor blends of a first polymer component and a second polymer component), no additional homopolymers or copolymers of propylene need to be blended with the propylene-based polymer compositions post-reactor to form the elastic layers. In other words, the elastic layers of the nonwoven fabrics can be substantially free of other propylene homopolymers and copolymers added post-reactor. While additional polymers may be blended, they are not required to achieve high MFR and good processability. This can result in improved meltblown nonwoven fabrics, because the post-reactor addition of other polymers, such as propylene homopolymers, increases the manufacturing cost and may reduce the elastic performance of the fabrics.

As used herein, "meltblown fibers" and "meltblown fabrics" refer to fibers formed by extruding a molten thermoplastic material at a certain processing temperature through a plurality of fine, usually circular, die capillaries as molten threads or filaments into high velocity, usually hot, gas streams which attenuate the filaments of molten thermoplastic material to reduce their diameter, which may be to microfiber diameter. Thereafter, the meltblown fibers are carried by the high velocity gas stream and are deposited on a collecting surface to form a web or nonwoven fabric of randomly dispersed meltblown fibers. Such a process is generally described in, for example, U.S. Pat. Nos. 3,849,241 and 6,268,203. Meltblown fibers are microfibers that are either continuous or discontinuous, and, depending on the resin, may be smaller than about 10 microns; or for certain resins or certain high throughput processes such as those described herein, meltblown fibers may have diameters greater than 10 microns, such as from about 10 to about 30 microns, or about 10 to about 15 microns. The term meltblowing as used herein is meant to encompass the meltspray process.

Commercial meltblown processes utilize extrusion systems having a relatively high throughput, in excess of 0.3 grams per hole per minute ("ghm"), or in excess of 0.4 ghm, or in excess of 0.5 ghm, or in excess of 0.6 ghm, or in excess of 0.7 ghm. The fabrics of the present invention may be produced using commercial meltblown processes, for example they may be produced using a high pressure meltblown process available from Biax-Fiberfilm Corporation. In one or more embodiments, the fibers used to form the nonwoven fabrics are formed using an extrusion system having a throughput rate of from about 0.01 to about 3.0 ghm, or from about 0.1 to about 2.0 ghm, or from about 0.3 to about 1.0 ghm.

In some embodiments, the fibers used to form the nonwoven fabrics are formed with an extrusion system producing a die pressure less than or equal to about 3000 psi (20684 kPa), or less than or equal to about 2500 psi (17237 kPa), or less than or equal to about 2000 psi (13790 kPa), or less than or equal to about 1750 psi (12066 kPa), or less than or equal to about 1500 psi (10342 kPa). In the same or other embodiments, the die pressure of the extrusion system may be greater than 100 psi (689 kPa), or greater than 250 psi (1724 kPa), or greater than 500 psi (3447 kPa), or greater than 750 psi (5171 kPa), or greater than 1000 psi (6895 kPa). In one or more embodiments, the die pressure is at least about 5%, or at least about 10%, or at least about 15%, or at least about 20%, or at least about 25%, or at least about 30%, or at least about 35%, or at least about 40% lower than that required to process a similar propylene-based polymer having the same overall ethylene content but having an MFR less than 30 g/10 min at the same throughput rate.

The extrusion system used to produce fibers may be operated at a process temperature less than about 575° F. (302° C.), or less than about 570° F. (299° C.), or less than about 560° F. (293° C.), or less than about 550° F. (288° C.), or less than about 540° F. (282° C.).

In a typical spunbond process, polymer is supplied to a heated extruder to melt and homogenize the polymers. The extruder supplies melted polymer to a spinneret where the polymer is fiberized as passed through fine openings arranged in one or more rows in the spinneret, forming a curtain of filaments. The filaments are usually quenched with air at a low temperature, drawn, usually pneumatically, and deposited on a moving mat, belt or "forming wire" to form the nonwoven fabric. See, for example, in U.S. Pat. Nos. 4,340,563; 3,692,618; 3,802,817; 3,338,992; 3,341,394; 3,502,763; and 3,542,615. The term spunbond as used herein is meant to include spunlace processes, in which the filaments are entangled to form a web using high-speed jets of water (known as "hydroentanglement").

The fibers produced in the spunbond process are usually in the range of from about 10 to about 50 microns in diameter, depending on process conditions and the desired end use for the fabrics to be produced from such fibers. For example, increasing the polymer molecular weight or decreasing the processing temperature can result in larger diameter fibers. Changes in the quench air temperature and pneumatic draw pressure can also have an affect on fiber diameter.

The fabrics described herein may be a single layer, or may be multilayer laminates. One application is to make a laminate (or "composite") from meltblown fabric ("M") and spunbond fabric ("S"), which combines the advantages of strength from spunbonded fabric and the elasticity of the meltblown fabric. A typical laminate or composite has three or more layers, a meltblown layer(s) sandwiched between two or more spunbonded layers, or "SMS" fabric composites. Examples of other combinations are SSMMSS, SMMS, and SMMSS composites. Composites can also be made of the meltblown or spunbond fabrics of the invention with other materials, either synthetic or natural, to produce useful articles.

The meltblown or spunbond nonwoven fabrics of the invention may comprise one or more elastic layers comprising a propylene-based polymer composition as previously described and further comprise one or more facing layers positioned on one or both sides of the elastic layer(s). The facing layer or layers may comprise any material known in the art to be suitable for use in such layers. Examples of suitable facing layer materials include, but are not limited to, any available material typically used as a facing layer, such as polypropylene (PP), polyethylene (PE), polyethylene terephthalate (PET), polylactic acid (PLA), and polymer or fiber blends of two or more of the foregoing including bicomponent fibers such as those having a sheath-core structure.

A variety of additives may be incorporated into the polymer compositions used to make the fibers and fabrics described herein, depending upon the intended purpose. Such additives may include, but are not limited to, stabilizers, antioxidants, fillers, colorants, nucleating agents, dispersing agents, mold release agents, slip agents, fire retardants, plasticizers, pigments, vulcanizing or curative agents, vulcanizing or curative accelerators, cure retarders, processing aids, tackifying resins, and the like. Other additives may include fillers and/or reinforcing materials, such as carbon black, clay, talc, calcium carbonate, mica, silica, silicate, combinations thereof, and the like. Primary and secondary antioxidants include, for example, hindered phenols, hindered amines, and phosphates. Nucleating agents include, for example, sodium benzoate, talc, polypropylene homopolymers, polyethylene polymers. Also, to improve crystallization rates, other nucleating agents may also be employed such as Ziegler-Natta olefin products or other highly crystalline polymers. Other additives such as dispersing agents, for example, Acrowax C, can also be included. Slip agents include, for example, oleamide and erucamide. Catalyst deactivators are also commonly used, for example, calcium stearate, hydrotalcite, and calcium oxide, and/or other acid neutralizers known in the art.

The nonwoven products described above may be used in many articles such as hygiene products including, but not limited to, diapers, feminine care products, and adult incontinent products. The nonwoven products may also be used in medical products such as sterile wrap, isolation gowns, operating room gowns, surgical gowns, surgical drapes, first aid dressings, and other disposable items. The nonwoven products may also be used as elastic protective coverings.

The meltspun nonwoven composition may have at least one elastic layer, wherein the elastic layer comprises a propylene-based polymer composition, as described above. The propylene-based polymer composition is a reactor blend of a first polymer component and a second polymer component, where the first polymer component comprises propylene and ethylene and has an ethylene content $R_1$ of from greater than 12 to less than 19 wt % ethylene, where the percentage by weight is based upon the total weight of the propylene-derived and ethylene-derived units of the first polymer component, where the second polymer component comprises propylene and ethylene and has an ethylene content $R_2$ of from greater than 4 to less than 10 wt % ethylene, where the percentage by weight is based upon the total weight of the propylene-derived and ethylene-derived units of the second polymer component, and wherein the ethylene content of the first and second polymer components satisfy the formula: $-1.7143R_1+29.771 \leq R_2 \leq -1.9167R_1+37.25$. Such, meltspun nonwoven compositions may exhibit a desirable balance of retractive force and permanent set. For example, the nonwoven composition may exhibit increased retractive force while maintaining a low permanent set and/or the nonwoven composition may exhibit similar or reduced retractive force at lower basis weights.

The meltspun nonwoven composition can have an improved balance of permanent set and retractive force as compared to nonwoven compositions containing different propylene-based polymer compositions. For example, a meltspun nonwoven composition having the above described propylene-based polymer composition may have an increased retractive force and a permanent set that is equal to or less than a comparative fabric that is the same and is made in the same manner, except that the propylene-based polymer composition has different ethylene contents of the first or second polymer component. In some embodiments, the meltspun nonwoven composition has a permanent set that is within 1%, or within 0.5%, or equal to, or less than the permanent set of a comparative nonwoven composition and a retractive force that is greater than the retractive force, such as 3% greater, or 5% greater, or 10% greater, or 20% greater, of a comparative nonwoven composition, where the comparative nonwoven composition is the same as the meltspun nonwoven composition except that (i) the comparative nonwoven composition is made with a propylene-based polymer composition which has a first polymer component that has a decreased ethylene content and a second polymer component has the same ethylene content; (ii) the comparative nonwoven composition is made with a propylene-based polymer composition which has a first polymer component that has an increased ethylene content and a second polymer component has the same ethylene content; (iii) the comparative nonwoven composition is made with a propylene-based polymer composition which has a first polymer component that has the same ethylene content and a second polymer component has a decreased ethylene content; or (iv) the comparative nonwoven composition is made with a propylene-based polymer composition which has a first polymer component that has the same ethylene content and a second polymer component has an increased ethylene content.

In some embodiments, a meltspun nonwoven composition comprising the above described propylene-based polymer composition may have an increased retractive force, such as 3% greater, or 5% greater, or 10% greater, or 20% greater, and a permanent set that is within 1%, or within 0.5%, or equal to, or less than a comparative fabric that is the same and is made in the same manner, except that the comparative fabric is made with a propylene-based polymer composition that has a (i) first polymer component ethylene content $R_1$ of from less than 12 or greater than 19 wt % ethylene, where the percentage by weight is based upon the total weight of the propylene-derived and ethylene-derived units of the first polymer component, and/or the (ii) a second polymer component ethylene content $R_2$ of less than 4 or greater than 10 wt % ethylene, where the percentage by weight is based upon the total weight of the propylene-derived and ethylene-derived units of the second polymer component.

The elastic layers formed from the propylene-based polymer compositions described herein may have a $1^{st}$ cycle permanent set of less than 19%, or less than 18.5%, or less than 18%, or less than 17.8%, or less than 17.6%, or less than 17.4%, or less than 17.2%, or less than 17%. The elastic layers formed from the propylene-based polymer compositions described herein may have a $2^{nd}$ cycle permanent set value of less than about 10%, or less than about 9.5%, or less than about 8.5%, or less than about 8%.

In some embodiments, a 75 gsm basis weight elastic layer that is formed with a 16" die to collector distance ("DCD") at an air rate of 10 psi has a $1^{st}$ cycle permanent set of less than 18%, or less than 17.8%, or less than 17.5%. In some embodiments, a 75 gsm basis weight elastic layer that is formed with a 20" DCD at an air rate of 10 psi has a $1^{st}$ cycle permanent set of less than 18%, or less than 17.5%, or less than 17.3%, or less than 17.2%. In some embodiments, a 75 gsm basis weight elastic layer that is formed with a 20" DCD at an air rate of 10 psi has a first cycle permanent set of less than 18%, or less than 17.8%, or less than 17.6%.

The elastic layers may have $1^{st}$ cycle retractive force measurements (at 50% recovery), preferably at a basis weight of 75 gsm or less, of greater than about 1.3 N, or greater than about 1.5 N, or greater than about 1.6 N, or greater than about 1.75 N, or greater than 1.8N, or greater than about 1.9 N, or greater than about 2.0 N, and 2$^{nd}$ cycle retractive force measurements (at 50% recovery) greater than about 1.5 N, or greater than about 1.6 N, or greater than about 1.7 N, or greater than about 1.8 N, or greater than about 1.9 N, or greater than about 2.0 N.

Permanent set and retractive force at 50% recovery are determined as follows. Test samples measuring 50 mm×100 mm are stretched to 100% elongation at a speed of 500 mm/min. At 100% elongation, the samples are held for 1 second before being allowed to return to the starting position, also at a speed of 500 mm/min. The samples are held for 30 seconds, and the elongation cycle is repeated a second time. The test is conducted at 20° C. and 50% relative humidity. Permanent set is the increase in length, expressed as a percentage of the original length of the sample, by which the sample fails to return to its original length after each elongation cycle once the load is removed. For example, a permanent set of 0% means that after elongation the sample fully returns to its original length, while a permanent set of 100% means that the sample shows no elastic recovery at all after elongation. Retractive force at 50% recovery is the force exerted by a sample at 50% elongation, measured as the sample retracts from 100% elongation and expressed in N.

Using the above described propylene-based polymer compositions to make meltspun nonwoven compositions may result in process efficiencies and advantages. For example, the propylene-based polymer compositions may be able to be used at higher throughputs, which allow for cost savings for the nonwoven composition manufacturer and allows for production efficiencies. For example, if a nonwovens manufacturer is able to produce fabrics at higher throughputs, they are able to make more fabric in the same amount of time. The use of the above described propylene-based polymer compositions may also allow for downgauging of the elastic layer while still maintaining good elastic properties, such as high retractive force. These lower basis weight elastic layers allow for efficiencies in material usage. The use of the above described propylene-based polymer compositions may also allow the nonwoven composition to be formed at lower melt temperature, which can result in less degradation of the polymer material. This can allow for more uniform basis weight fabrics to be produced and can also help in reducing the amount of down time of the manufacturing equipment.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example 1

Propylene-based polymer compositions that were a reactor blend of a first polymer component and a second polymer component were made as parallel reactor blends as described above. The polymer samples had the properties identified in Table 1.

The $R_1$ (wt %) is the ethylene content of the first polymer component, based upon the total weight of the propylene-derived and ethylene-derived units of the first polymer component. The $R_2$ (wt %) is the ethylene content of the second polymer component, based upon the total weight of the propylene-derived and ethylene-derived units of the second polymer component. The Total $C_2$ (wt %) is the ethylene content of the propylene-based polymer composition, where the percentage by weight is based upon the total weight of the propylene-derived and ethylene-derived units of the propylene-based polymer composition. The polysplit is the weight percentage of the second polymer component, based on the weight of the propylene-based polymer composition. The Total MFR is the Melt Flow Rate (MFR) ($I_{2.16}$ at 230° C.) of the propylene-based polymer composition as determined by ASTM D1238.

TABLE 1

Propylene-based Polymer Compositions

| Sample | $R_1$ (wt %) | $R_2$ (wt %) | Total $C_2$ (wt %) | Polysplit | Total MFR |
|---|---|---|---|---|---|
| Control | 16.0 | 4.0 | 15.0 | 10 | 20 |
| A | 17.4 | 5.5 | 15.0 | 19 | 29 |
| B | 16.2 | 6.2 | 14.4 | 15 | 47 |
| C | 16.1 | 5.3 | 14.8 | 15 | 31 |
| D | 15.3 | 9.9 | 15.0 | 10 | 46 |
| E | 15.0 | 8.5 | 14.4 | 10 | 43 |
| F | 14.9 | 9.2 | 14.3 | 10 | 51 |
| G | 15.4 | 5.0 | 15.0 | 10 | 20 |
| H | 14.7 | 6.3 | 14.4 | 10 | 48 |
| I | 13.8 | 7.6 | 13.8 | 10 | 49 |
| J | 13.9 | 8.4 | 13.1 | 10 | 50 |
| K | 13.5 | 8.5 | 13.2 | 10 | 53 |
| L | 13.4 | 8.6 | 12.5 | 10 | 34 |
| M | 14.1 | 5.6 | 12.5 | 15 | 42 |
| N | 12.9 | 5.3 | 11.7 | 10 | 95 |
| O | 12.7 | 8.0 | 12.2 | 10 | 54 |

The polymer samples were used to create a number of nonwoven compositions. A Biax-Fiberfilm™ meltblown line (Biax-Fiberfilm Corp., Greenville, Wis.) operating at a melt pressure within the range from 500 psi to 2000 psi and a melt temperature within the range from 260 to 300° C. and using an array die with a spinneret hole density of between 50 and 200 holes/inch is used to form the meltblown elastic layer. The line includes an extruder, a die-block and spinneret, as well as an air manifold for the spinneret supplying air pressures within the range from 5 to 20 psi (34 kPa to 138 kPa) and air temperatures within the range from 260 to 300° C. The polymer samples were melted in an extruder, and then meltblown via the Biax-Fiberfilm array die, onto an extensible construction of spunlace fabric (50/50 PP fibers/ PET fibers, 30 g/m², Jacob-Holm Industries, Inc.) that is passed underneath or in front of the forming fibers of meltblown polymer. The fiber average diameter is within the range of from 10 to 30 μm. The distance between the spinnerets and the passing spunlace fabric (die to collector distance ("DCD")) was adjusted to form a variety of fabrics as noted below.

While producing the fabrics, samples of the elastic fibers were collected and quenched on a metal plate. MFR measurements were made on the fiber samples, with the results reported in Table 2.

In Table 2, the throughput is the throughput of the polymer melt through the spinneret in grams/hole/minute (ghm). The temperature is the temperature of the polymer melt in the extruder in ° F. The MFR is the Melt Flow Rate (MFR) ($I_{2.16}$ at 230° C.) of the sample as determined by ASTM D1238. The MFR Ratio is determined by dividing the MFR of the fiber extrudate by the MFR of the pellet. In general, the higher the MFR Ratio the greater the degradation of a given polymer.

TABLE 2

The Change In MFR of the Fiber Extrudate

| Sample | Throughput (ghm) | Temp (° F.) | MFR | MFR Ratio |
|---|---|---|---|---|
| Control | pellets | — | 20 | — |
| Control | 0.49 | 575 | 71 | 3.55 |
| A | pellets | — | 28 | — |
| A | 0.51 | 575 | 64 | 2.28 |
| B | pellets | — | 42 | — |
| B | 0.51 | 575 | 85 | 2.01 |
| B | 0.66 | 575 | 63 | 1.51 |
| C | pellets | — | 31 | — |
| C | 0.51 | 575 | 60 | 1.94 |
| D | pellets | — | 46 | — |
| D | 0.51 | 575 | 90 | 1.93 |
| D | 0.74 | 575 | 69 | 1.50 |
| E | pellets | — | 43 | — |
| E | 0.51 | 575 | 76 | 1.74 |
| E | 0.66 | 575 | 61 | 1.41 |
| F | pellets | — | 49 | — |
| F | 0.51 | 575 | 82 | 1.67 |
| F | 0.74 | 575 | 92 | 1.89 |
| F | 0.51 | 540 | 101 | 2.06 |
| G | pellets | — | 48 | — |
| G | 0.51 | 575 | 112 | 2.33 |
| G | 0.66 | 575 | 69 | 1.43 |
| H | pellets | — | 43 | — |
| H | 0.51 | 575 | 97 | 2.29 |
| I | pellets | — | 48 | — |
| I | 0.51 | 575 | 100 | 2.07 |
| I | 0.74 | 575 | 118 | 2.45 |
| J | pellets | — | 50 | — |
| J | 0.51 | 575 | 148 | 2.98 |
| J | 0.78 | 575 | 82 | 1.64 |
| K | pellets | — | 32 | — |
| K | 0.51 | 575 | 111 | 3.47 |
| K | 0.58 | 575 | 63 | 1.97 |
| L | pellets | — | 48 | — |
| L | 0.51 | 575 | 82 | 1.73 |
| L | 0.74 | 575 | 77 | 1.63 |
| M | pellets | — | 44 | — |
| M | 0.51 | — | 55 | 1.24 |
| N | pellets | — | 72 | — |
| N | 0.51 | 525 | 78 | 1.08 |
| N | 0.51 | 575 | 142 | 1.97 |
| N | 1 | 575 | 108 | 1.50 |
| O | pellets | — | 50 | — |
| O | 0.51 | 575 | 94 | 1.88 |

Figure 2:
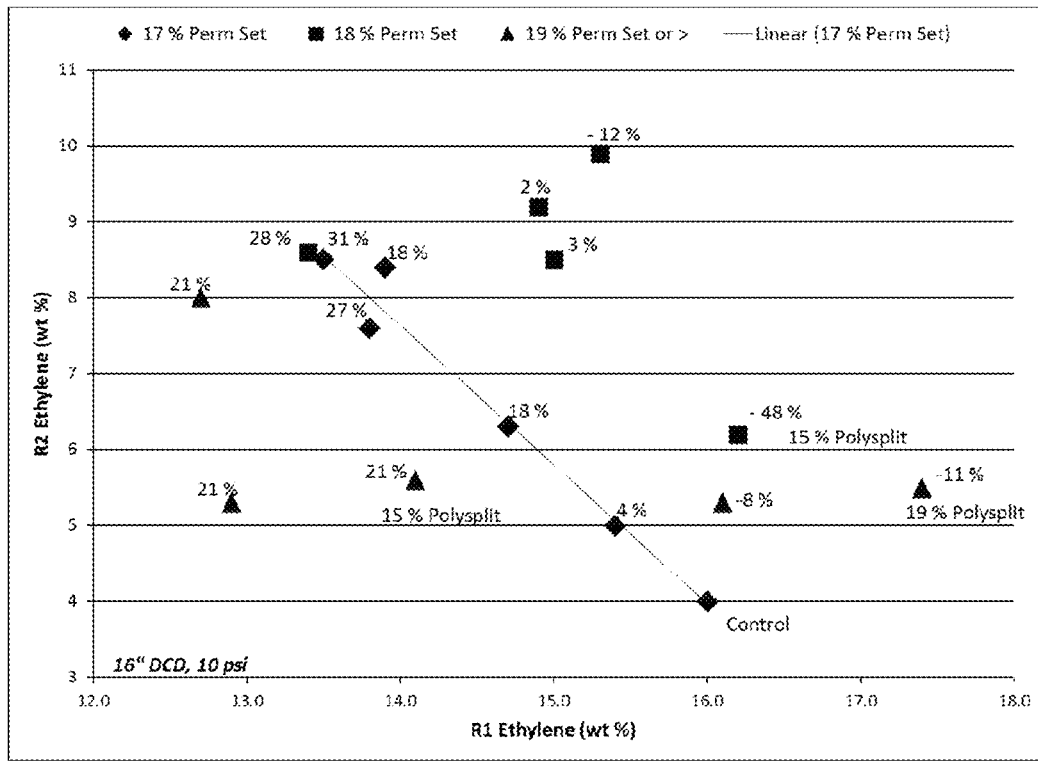
FIG. 2 illustrates the ethylene content and permanent set of fabrics of the Example 1 made with a 16" DCD and an air rate of 10 psi.

As described above, the polymer samples were used to form a variety of nonwoven compositions. The first set of fabrics were made using a 16″ DCD and an air rate of 10 psi, at the throughput and basis weights described in Table 3. The properties of the resulting fabrics are described in Table 3. FIG. 1 illustrates the ethylene content and permanent set of the nonwoven compositions described in Table 3. FIG. 2 illustrates the percent change in retractive force of the nonwoven compositions of Table 3 compared to the control composition.

In Table 3, the "Throughput" is the throughput of the polymer melt through the spinneret in ghm. The "Basis WT" is the basis weight of the nonwoven composition (facing layers and the elastic layer) in gsm. The "Basis Wt Elastic Layer" is the basis weight in gsm of only the elastic layer. The "1$^{st}$ UnLoad at 50% Max Strain" is the retractive force of the nonwoven composition during the first cycle in Newtons. The "1$^{st}$ Perm Set" is the first cycle permanent set of the nonwoven composition in percent. The "Δ rf" is the change in retractive force of the nonwoven composition as compared to the control composition. A negative Δ rf indicates that the sample nonwoven composition had a lower retractive force than the control composition, while a positive Δ rf indicates that the sample nonwoven composition had a higher retractive force than the control composition.

The permanent set and retractive force at 50% recovery were determined as follows. Test samples measuring 50 mm×100 mm are stretched to 100% elongation at a speed of 500 mm/min. At 100% elongation, the samples are held for 1 second before being allowed to return to the starting position, also at a speed of 500 mm/min. The samples are held for 30 seconds, and the elongation cycle is repeated a second time. The test is conducted at 20° C. and 50% relative humidity. Permanent set is the increase in length, expressed as a percentage of the original length of the sample, by which the sample fails to return to its original length after each elongation cycle once the load is removed. Retractive force at 50% recovery is the force exerted by a sample at 50% elongation, measured as the sample retracts from 100% elongation and expressed in N.

TABLE 3

16″ DCD and 10 psi Nonwoven Compositions

| Sample | Through-put | Basis WT (gsm) | Basis Wt Elastic Layer (gsm) | 1st Load at Max Tensile | 1st UnLoad at 50% Max Strain | 1st Perm Set | Δ rf |
|---|---|---|---|---|---|---|---|
| Control | 0.49 | 136 | 76 | 11.5 | 1.80 | 16.5 | 0 |
| A | 0.51 | 133 | 73 | 12.3 | 1.60 | 19.2 | −11% |
| B | 0.51 | 135 | 75 | 13.7 | 0.94 | 18.1 | −48% |
| C | 0.51 | 134 | 74 | 14.0 | 1.66 | 18.6 | −8% |
| D | 0.51 | 129 | 69 | 12.1 | 1.58 | 18.0 | −12% |
| E | 0.51 | 131 | 71 | 14.6 | 1.86 | 17.8 | 3% |
| F | 0.51 | 133 | 73 | 15.0 | 1.83 | 17.8 | 2% |
| G | 0.51 | 131 | 71 | 13.3 | 1.87 | 17.2 | 4% |
| H | 0.51 | 132 | 72 | 16.8 | 2.12 | 17.1 | 18% |
| I | 0.51 | 140 | 80 | 15.7 | 2.29 | 17.0 | 27% |
| J | 0.51 | 132 | 72 | 16.1 | 2.12 | 17.3 | 18% |
| K | 0.51 | 138 | 78 | 15.4 | 2.36 | 16.6 | 31% |
| L | 0.51 | 136 | 76 | 17.2 | 2.30 | 17.6 | 28% |
| M | 0.51 | 132 | 72 | 17.1 | 2.17 | 18.8 | 21% |
| N | 0.51 | 136 | 76 | 18.5 | 2.18 | 19.0 | 21% |
| O | 0.51 | 132 | 72 | 17.7 | 2.18 | 18.5 | 21% |

Figure 3:
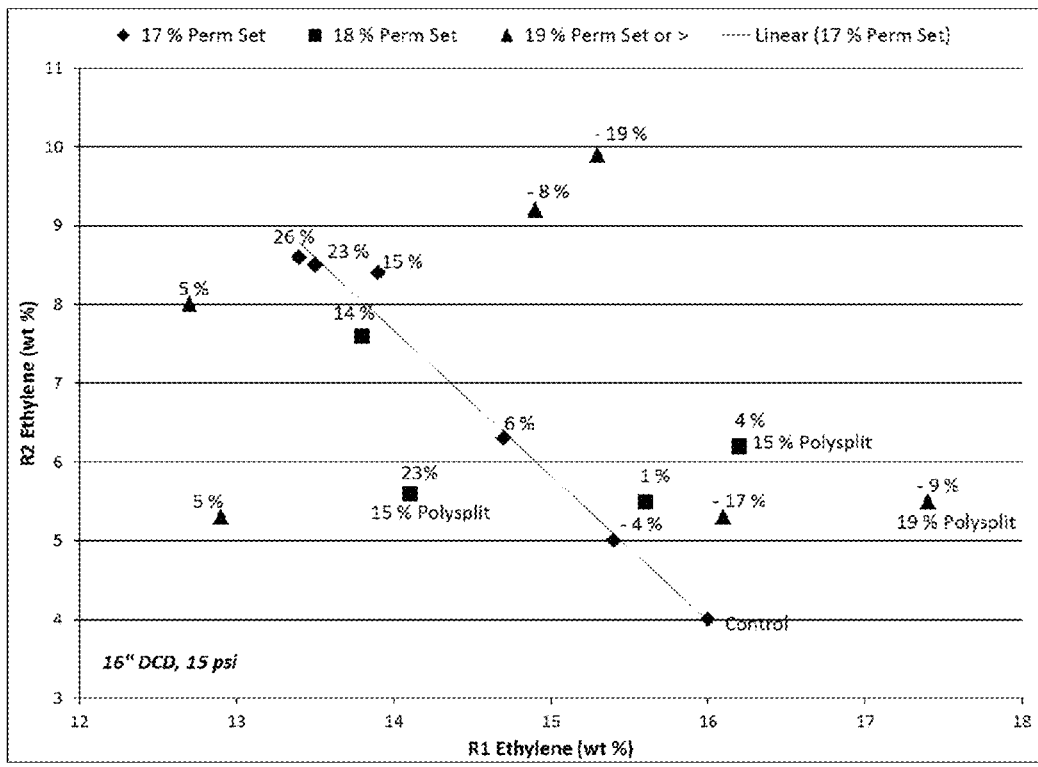
FIG. 3 illustrates the ethylene content and permanent set of fabrics of the Example 1 made with a 16" DCD and an air rate of 15 psi.

A second set of nonwoven compositions was made, as described above, with a 16″ DCD and an air rate of 15 psi as described in Table 4 and FIG. 3. The columns in Table 4 are as described above with reference to Table 3. The "1$^{st}$ Load Loss" in Table 4 is the load at 50% maximum strain on the extension curve minus the unloaded 50% strain, divided by the load at 50% maximum strain on the extension curve, and is noted in percent. The "1$^{st}$ Mech Hyst" is the area between the extension and return curves divided by the total area under the extension curve, and is noted in percent.

Table 4-16" DCD and 15 Psi Nonwoven Compositions

TABLE 4

16" DCD and 10 psi Nonwoven Compositions

| Sample | Throughput | Basis WT (gsm) | Basis Wt Elastic Layer (gsm) | 1st Load at Max Tensile | 1st UnLoad at 50% Max Strain | 1st Load Loss | 1st Perm Set | 1st Mech Hyst | Δ rf |
|---|---|---|---|---|---|---|---|---|---|
| Control | 0.49 | 135 | 75 | 11.5 | 1.9 | 72.82 | 16.2 | 64.51 | 0 |
| A | 0.51 | 133 | 73 | 13.2 | 1.7 | 78.5 | 19.3 | 69.6 | −9% |
| B | 0.51 | 135 | 75 | 13.6 | 1.9 | 77.0 | 18.2 | 68.3 | 4% |
| C | 0.51 | 134 | 74 | 13.6 | 1.5 | 80.2 | 20.1 | 70.3 | −17% |
| D | 0.51 | 129 | 69 | 11.9 | 1.5 | 78.4 | 18.7 | 69.5 | −19% |
| E | 0.51 | 132 | 72 | 14.2 | 1.9 | 77.6 | 17.8 | 68.7 | 1% |
| F | 0.51 | 133 | 73 | 14.6 | 1.7 | 79.6 | 18.5 | 70.4 | −8% |
| G | 0.51 | 134 | 74 | 12.3 | 1.8 | 75.4 | 17.1 | 67.0 | −4% |
| H | 0.51 | 129 | 69 | 15.0 | 2.0 | 77.1 | 17.3 | 67.8 | 6% |
| I | 0.51 | 135 | 75 | 16.0 | 2.1 | 78.2 | 17.6 | 69.0 | 14% |
| J | 0.51 | 132 | 72 | 15.6 | 2.1 | 78.0 | 16.7 | 68.9 | 15% |
| K | 0.51 | 133 | 73 | 15.9 | 2.3 | 77.3 | 17.0 | 68.2 | 23% |
| L | 0.51 | 133 | 73 | 16.6 | 2.3 | 77.5 | 17.0 | 68.4 | 26% |
| M | 0.51 | 132 | 72 | 17.9 | 2.3 | 80.3 | 18.4 | 70.7 | 23% |
| N | 0.51 | 133 | 73 | 17.4 | 2.0 | 82.9 | 19.9 | 72.4 | 5% |
| O | 0.51 | 132 | 72 | 16.4 | 2.0 | 81.4 | 19.0 | 71.1 | 5% |

Figure 4:
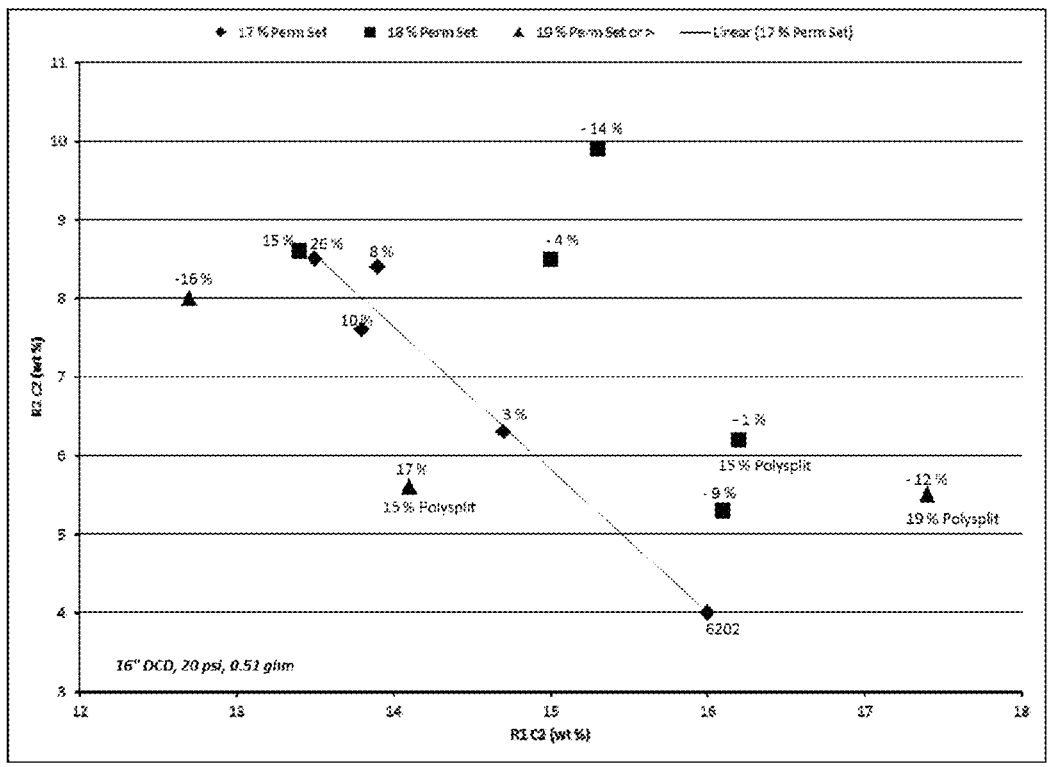
FIG. 4 illustrates the ethylene content and permanent set of fabrics of the Example 1 made with a 16" DCD and an air rate of 20 psi.

Another set of nonwoven compositions was made, as described above, with a 16" DCD and an air rate of 20 psi as described in Table 5 and FIG. 4. The columns in Table 5 are as described above with reference to Tables 3 and 4.

TABLE 5

16" DCD and 20 psi Nonwoven Compositions

| Sample | Throughput | Basis WT (gsm) | Basis Wt Elastic Layer (gsm) | 1st Load at Max Tensile | 1st UnLoad at 50% Max Strain | 1st Load Loss | 1st Perm Set | 1st Mech Hyst | Δ rf |
|---|---|---|---|---|---|---|---|---|---|
| Control | 0.49 | 137 | 77 | 12.7 | 1.97 | 73.4 | 16.1 | 65.0 | 0 |
| A | 0.51 | 136 | 76 | 14.4 | 1.73 | 79.4 | 19.8 | 70.3 | −12% |
| B | 0.51 | 132 | 72 | 14.1 | 1.95 | 77.6 | 18.4 | 68.7 | −1% |
| C | 0.51 | 134 | 74 | 14.4 | 1.80 | 78.0 | 18.2 | 68.8 | −9% |
| D | 0.51 | 131 | 71 | 13.5 | 1.69 | 78.2 | 18.1 | 69.2 | −14% |
| E | 0.51 | 133 | 73 | 15.5 | 1.89 | 78.7 | 18.1 | 69.6 | −4% |
| H | 0.51 | 131 | 71 | 15.5 | 2.03 | 77.3 | 17.1 | 67.9 | 3% |
| I | 0.51 | 133 | 73 | 16.4 | 2.16 | 78.3 | 17.4 | 69.1 | 10% |
| J | 0.51 | 130 | 70 | 15.3 | 2.13 | 78.0 | 16.8 | 68.6 | 8% |
| K | 0.51 | 137 | 77 | 16.7 | 2.48 | 76.7 | 16.6 | 67.8 | 26% |
| L | 0.51 | 136 | 76 | 16.5 | 2.27 | 77.8 | 17.5 | 68.4 | 15% |
| M | 0.51 | 130 | 70 | 18.5 | 2.31 | 80.7 | 18.7 | 71.1 | 17% |
| O | 0.51 | 128 | 68 | 15.6 | 1.66 | 82.0 | 19.9 | 71.4 | −16% |

Figure 5:
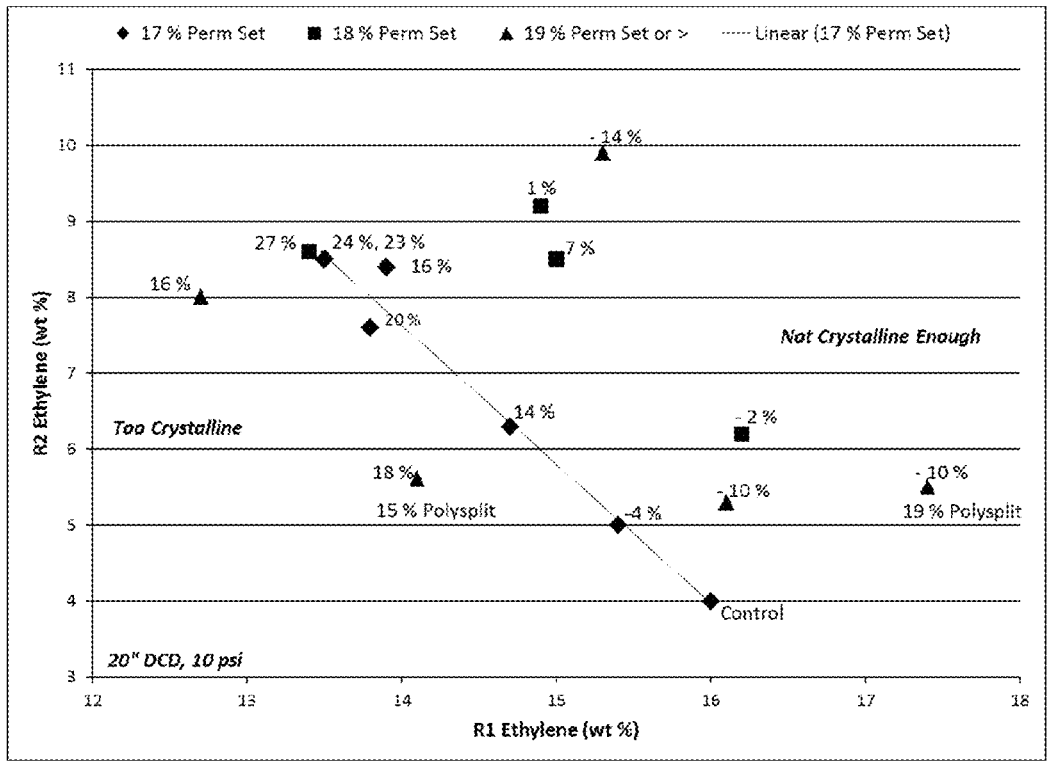
FIG. 5 illustrates the ethylene content and permanent set of fabrics of the Example 1 made with a 20" DCD and an air rate of 10 psi.

Another set of nonwoven compositions was made with a 20" DCD and an air rate of 10 psi as described in Table 6 and FIG. 5. The columns in Table 6 are as described above with reference to Tables 3 and 4.

TABLE 6

20" DCD and 10 psi Nonwoven Compositions

| Sample | Throughput | Melt Temp | 1st Load at Max Tensile | 1st UnLoad at 50% Max Strain | 1st Load Loss | 1st Perm Set | 1st Mech Hyst | Δ rf |
|---|---|---|---|---|---|---|---|---|
| Control | 0.49 | 129 | 9.68 | 1.64 | 71.52 | 16.31 | 63.5 | 0 |
| A | 0.51 | 132 | 11.1 | 1.48 | 77.6 | 19.55 | 68.7 | −10% |
| B | 0.51 | 129 | 11.0 | 1.60 | 76.5 | 18.43 | 67.4 | −2% |
| C | 0.51 | 131 | 10.9 | 1.48 | 76.8 | 18.59 | 67.8 | −10% |
| D | 0.51 | 129 | 11.2 | 1.40 | 78.6 | 19.00 | 69.8 | −15% |
| E | 0.51 | 130 | 12.7 | 1.76 | 76.6 | 17.50 | 68.0 | 7% |
| F | 0.51 | 128 | 13.4 | 1.66 | 78.8 | 18.12 | 69.7 | 1% |

TABLE 6-continued

| | | | | 20" DCD and 10 psi Nonwoven Compositions | | | | |
|---|---|---|---|---|---|---|---|---|
| Sample | Throughput | Melt Temp | 1st Load at Max Tensile | 1st UnLoad at 50% Max Strain | 1st Load Loss | 1st Perm Set | 1st Mech Hyst | Δ rf |
| G | 0.51 | 132 | 10.5 | 1.58 | 74.7 | 17.30 | 66.4 | −4% |
| H | 0.51 | 129 | 13.2 | 1.87 | 75.7 | 17.11 | 66.7 | 14% |
| I | 0.51 | 133 | 13.0 | 1.96 | 75.6 | 16.76 | 66.9 | 20% |
| J | 0.51 | 131 | 13.8 | 1.90 | 78.0 | 17.17 | 68.9 | 16% |
| K | 0.51 | 135 | 13.2 | 2.01 | 75.8 | 16.86 | 66.9 | 23% |
| L | 0.51 | 135 | 15.3 | 2.09 | 78.0 | 17.68 | 68.7 | 27% |
| M | 0.51 | 130 | 16.2 | 1.94 | 81.3 | 19.19 | 71.5 | 18% |
| O | 0.51 | 131 | 15.0 | 1.91 | 78.9 | 18.56 | 69.0 | 16% |

Figure 6:
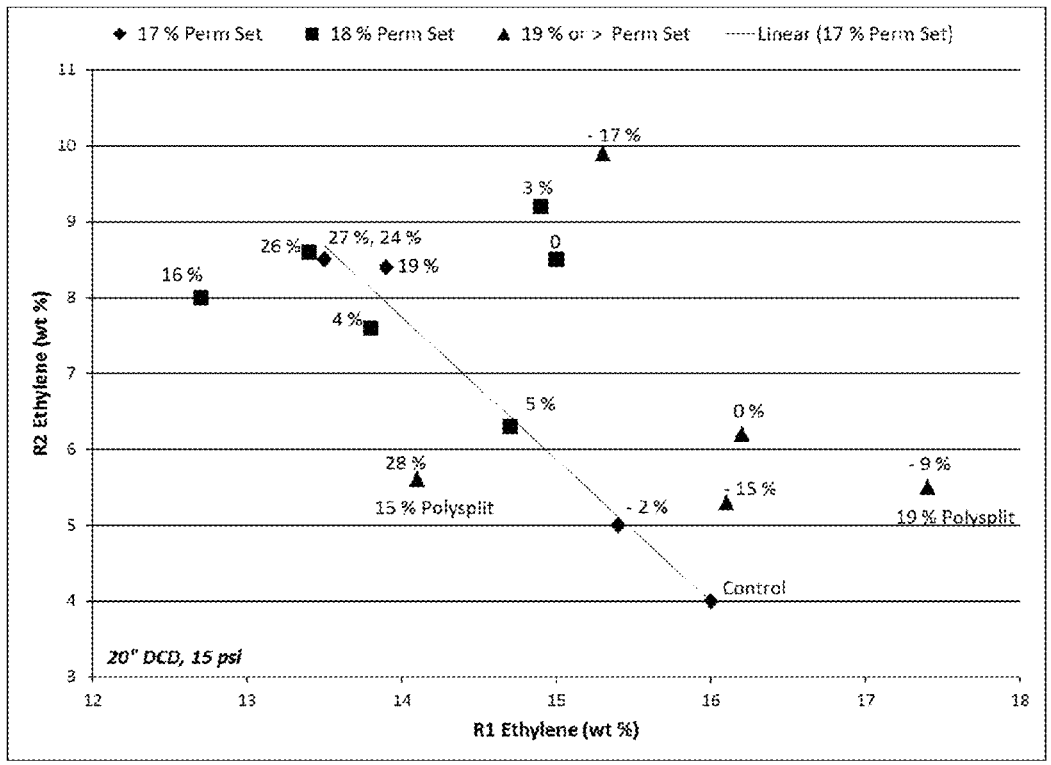
FIG. 6 illustrates the ethylene content and permanent set of fabrics of the Example 1 made with a 20" DCD and an air rate of 15 psi.

Another set of nonwoven compositions was made with a 20" DCD and an air rate of 10 psi as described in Table 7 and FIG. 6. The columns in Table 7 are as described above with reference to Tables 3 and 4.

TABLE 7

| | | | | 20" DCD and 15 psi Nonwoven Compositions | | | | |
|---|---|---|---|---|---|---|---|---|
| Sample | Throughput | Basis Wt (gsm) | Basis Wt Elastic Layer (gsm) | 1st Load at Max Tensile | 1st UnLoad at 50% Max Strain | 1st Load Loss | 1st Perm Set | 1st Mech Hyst | Δ rf |
| Control | 0.49 | 137 | 77 | 9.97 | 1.62 | 72.33 | 17.0 | 64.33 | 0 |
| A | 0.51 | 134 | 74 | 11.6 | 1.47 | 78.7 | 19.7 | 69.7 | −9% |
| B | 0.51 | 129 | 69 | 11.4 | 1.62 | 77.1 | 18.7 | 68.2 | 0% |
| C | 0.51 | 131 | 71 | 10.8 | 1.38 | 78.0 | 19.4 | 69.1 | −15% |
| D | 0.51 | 129 | 69 | 10.5 | 1.35 | 78.3 | 18.7 | 69.6 | −17% |
| E | 0.51 | 131 | 71 | 12.6 | 1.62 | 77.8 | 18.0 | 68.9 | 0% |
| F | 0.51 | 130 | 70 | 13.12 | 1.67 | 78.16 | 18.1 | 69.1 | 3% |
| G | 0.51 | 131 | 71 | 10.5 | 1.58 | 74.6 | 17.4 | 66.4 | −2% |
| H | 0.51 | 128 | 68 | 12.1 | 1.70 | 75.7 | 17.5 | 66.7 | 5% |
| I | 0.51 | 130 | 70 | 12.3 | 1.69 | 77.1 | 17.8 | 67.8 | 4% |
| J | 0.51 | 131 | 71 | 13.9 | 1.93 | 77.8 | 16.9 | 68.7 | 19% |
| K | 0.51 | 132 | 72 | 13.4 | 2.06 | 75.9 | 16.7 | 67.0 | 27% |
| L | 0.51 | 132 | 72 | 14.9 | 2.04 | 77.8 | 17.5 | 68.5 | 26% |
| M | 0.51 | 129 | 69 | 16.1 | 2.07 | 80.1 | 18.6 | 70.5 | 28% |
| O | 0.51 | 125 | 65 | 14.2 | 1.88 | 78.6 | 18.0 | 68.8 | 16% |

Figure 7:
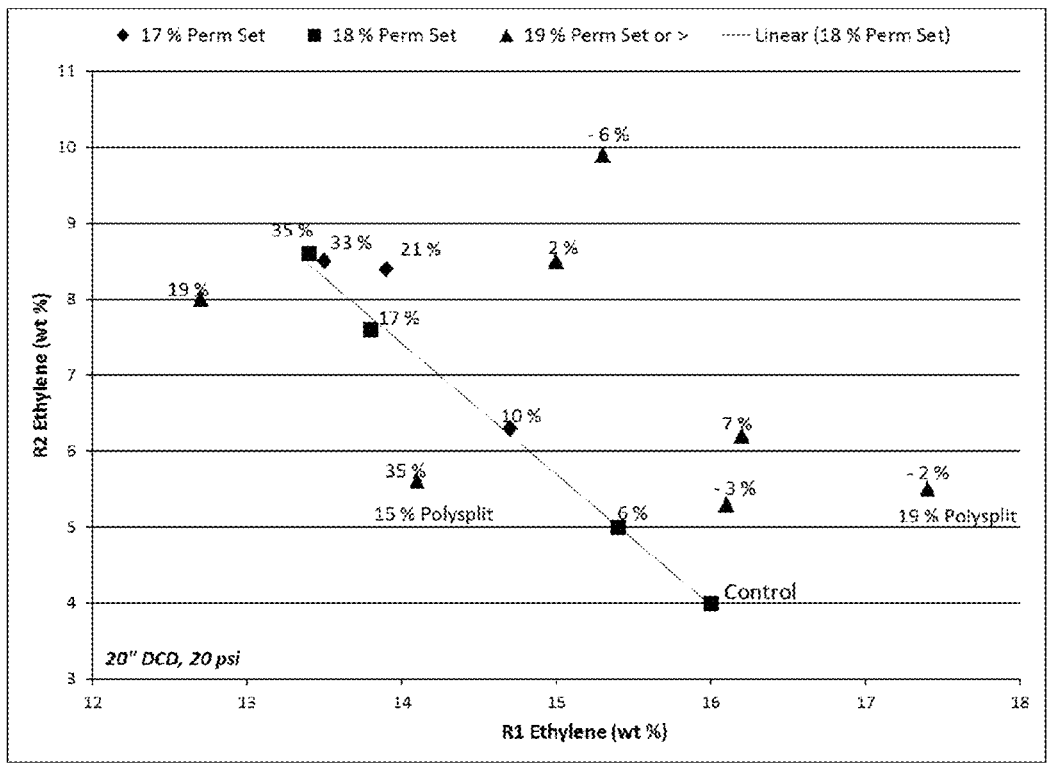
FIG. 7 illustrates the ethylene content and permanent set of fabrics of the Example 1 made with a 20" DCD and an air rate of 20 psi.

Another set of nonwoven compositions was made with a 20" DCD and an air rate of 20 psi as described in Table 8 and FIG. 7. The columns in Table 6 are as described above with reference to Tables 3 and 4.

TABLE 8

| | | | | 20" DCD and 20 psi Nonwoven Compositions | | | | |
|---|---|---|---|---|---|---|---|---|
| Sample | Throughput | Basis Wt (gsm) | Basis Wt Elastic Layer (gsm) | 1st Load at Max Tensile | 1st UnLoad at 50% Max Strain | 1st Load Loss | 1st Perm Set | 1st Mech Hyst | Δ rf |
| Control | 0.49 | 135 | 75 | 10.4 | 1.53 | 74.46 | 18 | 65.92 | 0 |
| A | 0.51 | 133 | 73 | 12.0 | 1.50 | 78.8 | 20 | 69.6 | −2% |
| C | 0.51 | 131 | 71 | 12.3 | 1.49 | 78.8 | 20 | 69.6 | −3% |
| D | 0.51 | 127 | 67 | 11.6 | 1.44 | 78.7 | 19 | 69.6 | −6% |
| E | 0.51 | 134 | 74 | 12.4 | 1.56 | 78.2 | 19 | 69.2 | 2% |
| G | 0.51 | 137 | 77 | 11.1 | 1.62 | 75.1 | 18 | 66.6 | 6% |
| H | 0.51 | 129 | 69 | 12.2 | 1.69 | 75.8 | 17 | 66.8 | 10% |
| I | 0.51 | 132 | 72 | 13.9 | 1.79 | 78.5 | 18 | 69.3 | 17% |
| J | 0.51 | 129 | 69 | 14.0 | 1.85 | 78.6 | 17 | 69.2 | 21% |
| K | 0.51 | 133 | 73 | 13.4 | 2.03 | 76.2 | 17 | 67.2 | 33% |
| L | 0.51 | 134 | 74 | 15.7 | 2.06 | 78.2 | 18 | 68.8 | 35% |
| M | 0.51 | 131 | 71 | 16.6 | 2.06 | 80.7 | 19 | 70.9 | 35% |
| N | 0.51 | 130 | 70 | 12.1 | 1.64 | 77.8 | 19 | 68.8 | 7% |
| O | 0.51 | 126 | 66 | 15.1 | 1.82 | 80.4 | 19 | 70.1 | 19% |

Figure 8:
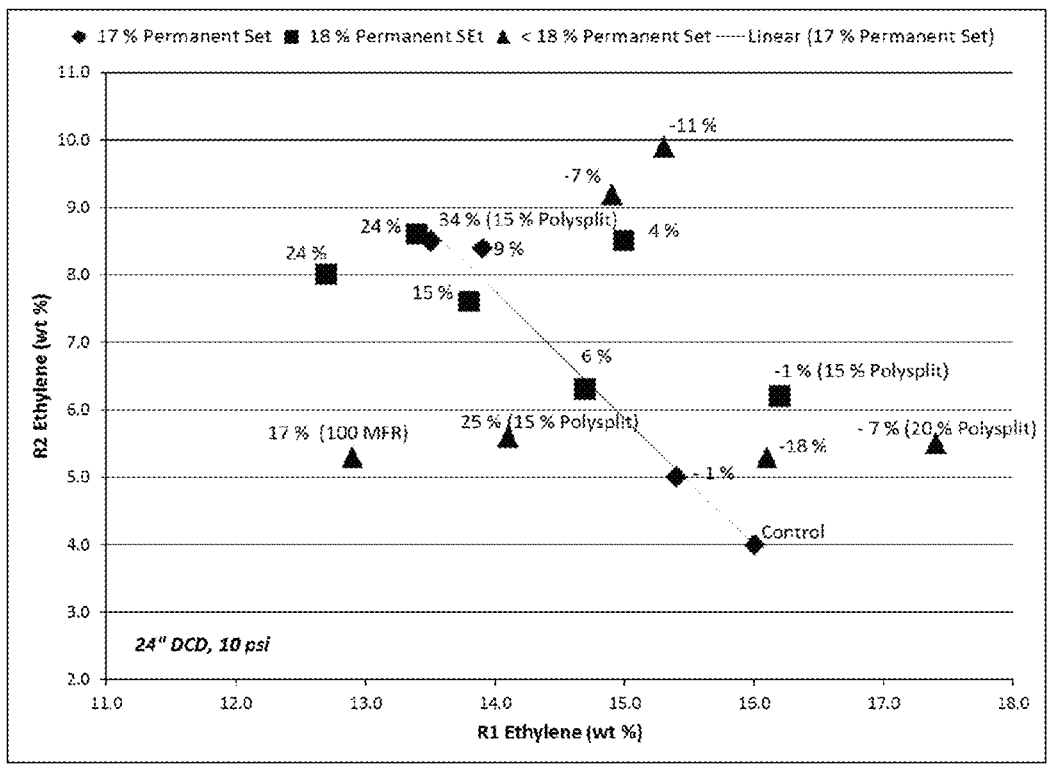
FIG. 8 illustrates the ethylene content and permanent set of fabrics of the Example 1 made with a 24" DCD and an air rate of 10 psi.

Another set of nonwoven compositions was made with a 24" DCD and an air rate of 10 psi as described in Table 9 and FIG. 8. The columns in Table 6 are as described above with reference to Tables 3 and 4.

TABLE 9

24" DCD and 10 psi Nonwoven Compositions

| Sample | Throughput | 1st Load at Max Tensile | 1st UnLoad at 50% Max Strain | 1st Load Loss | 1st Perm Set | 1st Mech Hyst | Δ rf |
|---|---|---|---|---|---|---|---|
| Control | 0.49 | 8.0 | 1.48 | 69.7 | 16.5 | 61.9 | — |
| A | 0.51 | 10.3 | 1.38 | 77.8 | 19.7 | 69.1 | −7% |
| B | 0.51 | 9.4 | 1.46 | 75.1 | 18.3 | 66.0 | −1% |
| C | 0.51 | 9.2 | 1.21 | 77.6 | 19.7 | 68.8 | −18% |
| D | 0.51 | 10.6 | 1.31 | 79.5 | 18.9 | 70.6 | −11% |
| E | 0.51 | 11.3 | 1.54 | 77.0 | 18.1 | 68.3 | 4% |
| F | 0.51 | 11.7 | 1.37 | 79.8 | 19.4 | 70.4 | −7% |
| G | 0.51 | 9.5 | 1.47 | 74.1 | 17.4 | 66.0 | −1% |
| H | 0.51 | 10.9 | 1.57 | 75.3 | 17.6 | 66.2 | 6% |
| I | 0.51 | 12.0 | 1.70 | 76.8 | 17.6 | 67.9 | 15% |
| J | 0.51 | 11.2 | 1.62 | 76.9 | 17.5 | 68.2 | 9% |
| K | 0.51 | 12.3 | 1.96 | 75.3 | 16.8 | 66.4 | 32% |
| L | 0.51 | 12.8 | 1.84 | 77.4 | 17.9 | 68.2 | 24% |
| M | 0.51 | 13.7 | 1.85 | 79.2 | 18.6 | 69.8 | 25% |
| N | 0.51 | 13.7 | 1.73 | 80.7 | 19.2 | 70.6 | 17% |
| O | 0.51 | 12.7 | 1.83 | 77.3 | 17.5 | 67.7 | 24% |

Figure 9:
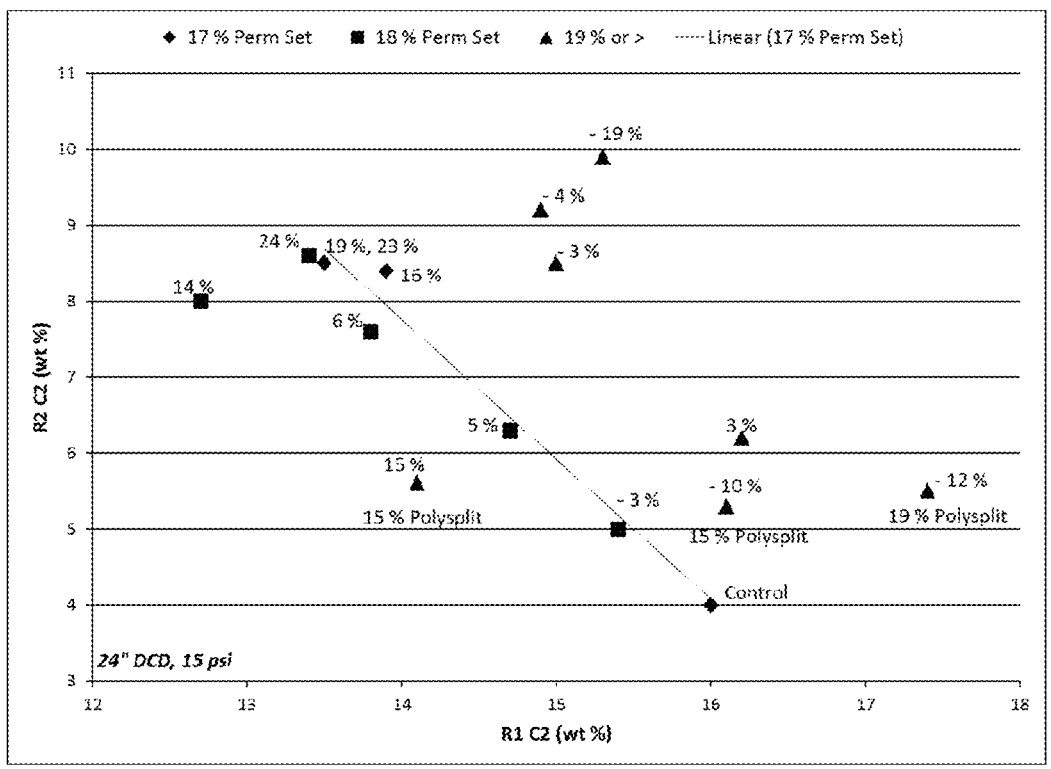
FIG. 9 illustrates 24" DCD and an air rate of 15 psi.

Another set of nonwoven compositions was made with a 24" DCD and an air rate of 15 psi as described in Table 10 and FIG. 9. The columns in Table 6 are as described above with reference to Tables 3 and 4.

TABLE 10

24" DCD and 15 psi Nonwoven Compositions

| Sample | Throughput | Basis Wt (gsm) | Basis Wt Elastic Layer (gsm) | 1st Load at Max Tensile | 1st UnLoad at 50% Max Strain | 1st Load Loss | 1st Perm Set | 1st Mech Hyst | Δ rf |
|---|---|---|---|---|---|---|---|---|---|
| Control | 0.49 | 133 | 73 | 9.6 | 1.55 | 72.5 | 17.0 | 64.2 | — |
| A | 0.51 | 134 | 74 | 10.3 | 1.37 | 77.6 | 20.0 | 68.8 | −12% |
| B | 0.51 | 137 | 77 | 11.3 | 1.60 | 77.1 | 18.8 | 68.0 | 3% |
| C | 0.51 | 131 | 71 | 10.7 | 1.39 | 77.6 | 19.2 | 68.6 | −10% |
| D | 0.51 | 134 | 74 | 10.0 | 1.25 | 78.9 | 19.2 | 69.9 | −19% |
| E | 0.51 | 131 | 71 | 11.9 | 1.51 | 78.1 | 18.6 | 69.3 | −3% |
| F | 0.51 | 133 | 73 | 11.7 | 1.49 | 78.1 | 18.5 | 68.8 | −4% |
| G | 0.51 | 134 | 74 | 10.0 | 1.50 | 74.9 | 17.6 | 66.4 | −3% |
| H | 0.51 | 127 | 67 | 10.1 | 1.49 | 75.0 | 17.6 | 66.0 | −4% |
| I | 0.51 | 135 | 75 | 12.1 | 1.65 | 77.5 | 17.9 | 68.3 | 6% |
| J | 0.51 | 129 | 69 | 13.0 | 1.80 | 77.7 | 17.3 | 68.4 | 16% |
| K | 0.51 | 133 | 73 | 12.7 | 1.91 | 76.6 | 17.5 | 67.4 | 23% |
| L | 0.51 | 138 | 78 | 14.0 | 1.92 | 77.9 | 18.1 | 68.6 | 24% |
| M | 0.51 | 129 | 69 | 15.0 | 1.79 | 81.5 | 19.4 | 71.4 | 15% |
| O | 0.51 | 129 | 69 | 13.4 | 1.76 | 78.7 | 18.4 | 69.0 | 14% |

Figure 10:
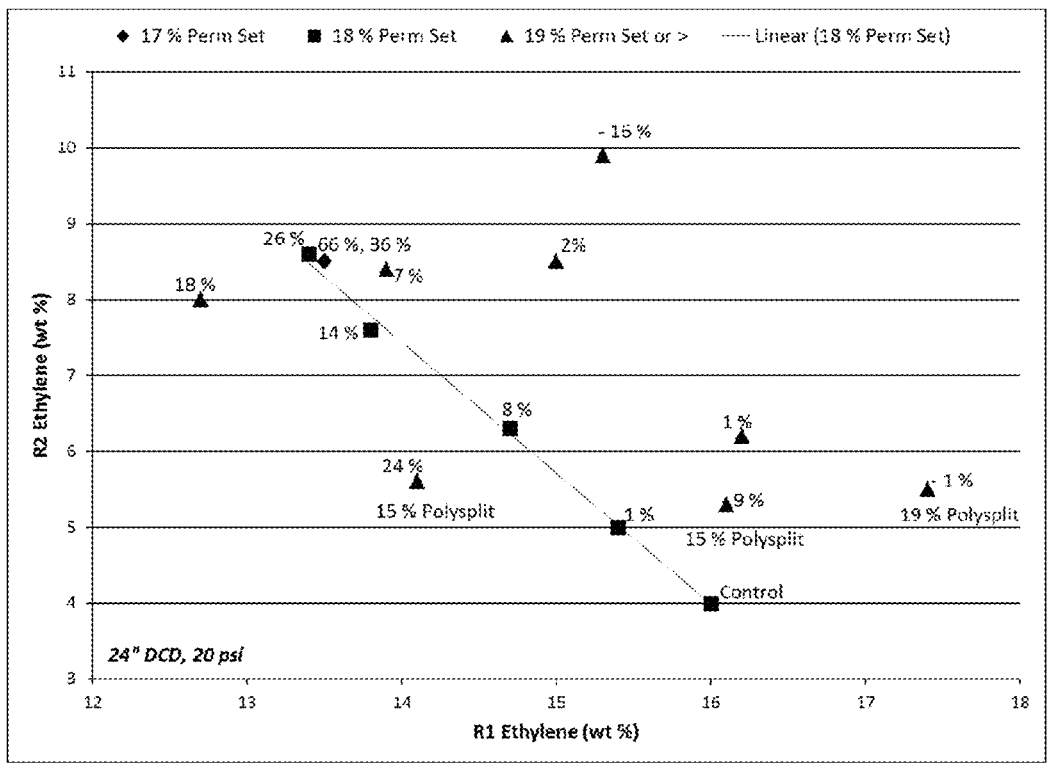
FIG. 10 illustrates the ethylene content and permanent set of fabrics of the Example 1 made with a 24" DCD and an air rate of 20 psi.

Another set of nonwoven compositions was made with a 24" DCD and an air rate of 20 psi as described in Table 11 and FIG. 10. The columns in Table 6 are as described above with reference to Tables 3 and 4.

TABLE 11

24" DCD and 20 psi Nonwoven Compositions

| Sample | Basis Wt (gsm) | Basis Wt Elastic Layer (gsm) | 1st Load at Max Tensile | 1st UnLoad at 50% Max Strain | 1st Load Loss | 1st Perm Set | 1st Mech Hyst | Δ rf |
|---|---|---|---|---|---|---|---|---|
| Control | 129 | 69 | 9.34 | 1.37 | 74.54 | 18.0 | 66.02 | — |
| A | 133 | 73 | 10.6 | 1.35 | 78.7 | 20.2 | 69.7 | −1% |
| B | 128 | 68 | 10.4 | 1.39 | 77.9 | 19.5 | 68.6 | 1% |
| C | 127 | 67 | 10.7 | 1.25 | 79.8 | 20.6 | 70.4 | −9% |

TABLE 11-continued

24" DCD and 20 psi Nonwoven Compositions

| Sample | Basis Wt (gsm) | Basis Wt Elastic Layer (gsm) | 1st Load at Max Tensile | 1st UnLoad at 50% Max Strain | 1st Load Loss | 1st Perm Set | 1st Mech Hyst | Δ rf |
|---|---|---|---|---|---|---|---|---|
| D | 129 | 69 | 10.0 | 1.15 | 80.6 | 20.1 | 71.4 | −16% |
| E | 128 | 68 | 11.9 | 1.40 | 79.7 | 19.4 | 70.5 | 2% |
| G | 130 | 70 | 9.5 | 1.39 | 75.1 | 18.0 | 66.6 | 1% |
| H | 128 | 68 | 10.9 | 1.48 | 76.3 | 18.0 | 67.0 | 8% |
| I | 129 | 69 | 12.1 | 1.56 | 78.3 | 18.4 | 68.9 | 14% |
| J | 126 | 66 | 11.9 | 1.46 | 79.8 | 18.6 | 70.2 | 7% |
| K | 130 | 70 | 12.4 | 1.86 | 76.3 | 17.3 | 67.1 | 36% |
| L | 133 | 73 | 12.9 | 1.72 | 78.4 | 18.4 | 68.6 | 26% |
| M | 126 | 66 | 14.1 | 1.70 | 81.0 | 19.5 | 71.1 | 24% |
| O | 125 | 65 | 14.2 | 1.62 | 80.9 | 19.4 | 70.5 | 18% |

As illustrated in the above Example 1, by controlling the ethylene content of the first reactor component and the second reactor component, nonwoven compositions were produced that had an improved balance of retractive force and permanent set. As illustrated, it is not just the overall total ethylene content of the propylene-based polymer composition that is important but also the ethylene content of the individual polymer components.

For example, in the enhanced compositional band, where the ethylene contents fell within the formula $-1.7143R_1 + 29.771 \leq R_2 \leq -1.9167R_1 + 37.25$, the nonwoven compositions had improved properties. It was found that as the total ethylene content and the R1 ethylene content decreased, in order to maintain or improve elastic properties, it was necessary to increase the R2 ethylene content. Without wishing to be bound by theory, it is believed that the compositions that fell too far to the left of this compositional band were too crystalline and thus had inadequate permanent set. Likewise, it is believed that compositions that fell too far to the right of this compositional band were not crystalline enough and thus exhibited inadequate retractive force and inadequate permanent set. Increasing the more crystalline component or polysplit failed to provide any benefit to the materials that were too amorphous. For more crystalline materials increasing the polysplit may increase the retractive force but permanent set was inadequate for the production of elastic nonwovens.

Example 2

In Example 2, a propylene-based polymer composition Sample P that was a reactor blend of a first polymer component and a second polymer component was made in parallel solution polymerization reactors as described above. The polymer samples had the properties identified in Table 12.

TABLE 12

Propylene-based Polymer Compositions

| Sample | R1 C2 (wt %) | R2 C2 (wt %) | Total C2 (wt %) | Poly-split | Total MFR (g/10 min) (2.16 kg at 230° C.) |
|---|---|---|---|---|---|
| Control | 16 | 4 | 15 | 10 | 20 |
| P | 13.8 | 9.2 | 13.3 | 10 | 48 |

As described above with reference to Example 1, the polymer samples were used to form a variety of nonwoven compositions at various basis weights. The fabrics were made using a 24" DCD and an air rate of 10 psi, at a throughput of 0.51 ghm, and at the basis weights described in Table 13.

TABLE 13

Propylene-based Polymer Compositions

| Sample | Melt Temperature (° F.) | Basis Wt (gsm) | Basis Wt Elastic Layer (gsm) | 1st Load at Max Tensile (N) | 1st Unload at 50% Max Strain (N) | 1st Permanent Set (%) | 1st Mechanical Hysteresis (%) |
|---|---|---|---|---|---|---|---|
| Control | 550 | 142 | 82 | 13.5 | 2.16 | 15.4 | 66 |
| Control | 550 | 131 | 71 | 16.3 | 1.68 | 18.5 | 73 |
| Control | 550 | 114 | 54 | 13.7 | 1.09 | 21.9 | 76 |
| P | 520 | 140 | 80 | 15.0 | 2.34 | 14.9 | 66 |
| P | 520 | 129 | 69 | 12.9 | 1.82 | 15.9 | 68 |
| P | 520 | 111 | 51 | 10.6 | 1.20 | 18.7 | 71 |

Figure 11:
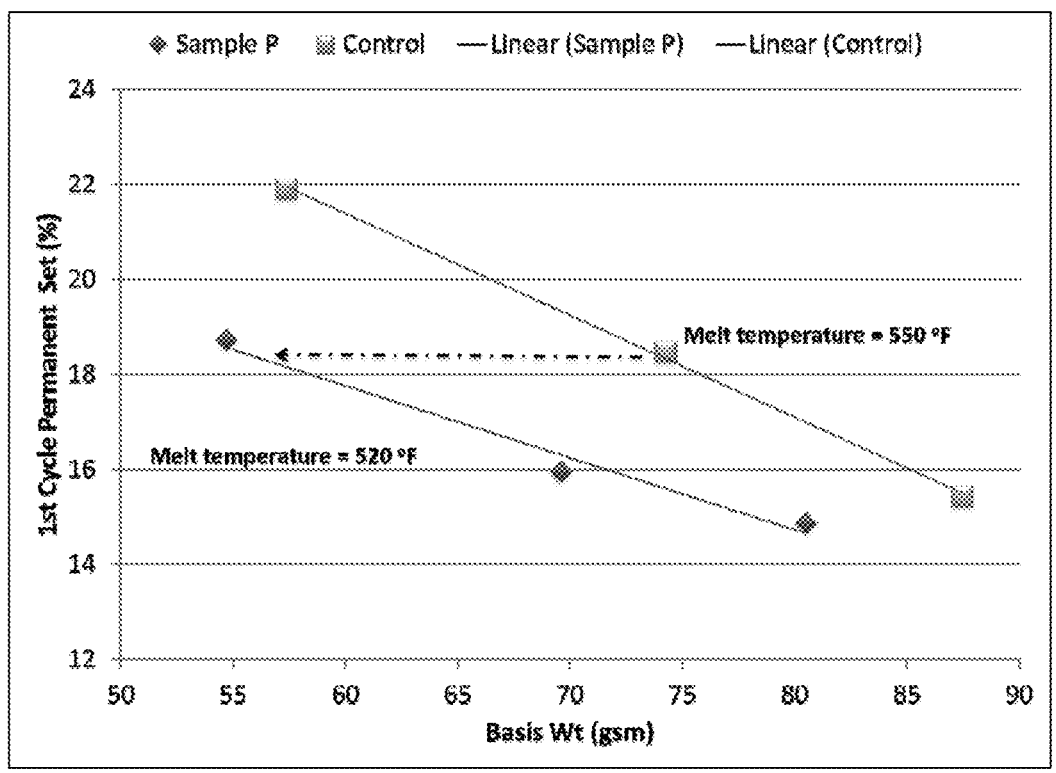
FIG. 11 compares the permanent set and the basis weights for the fabrics of Example 2.
Figure 12:
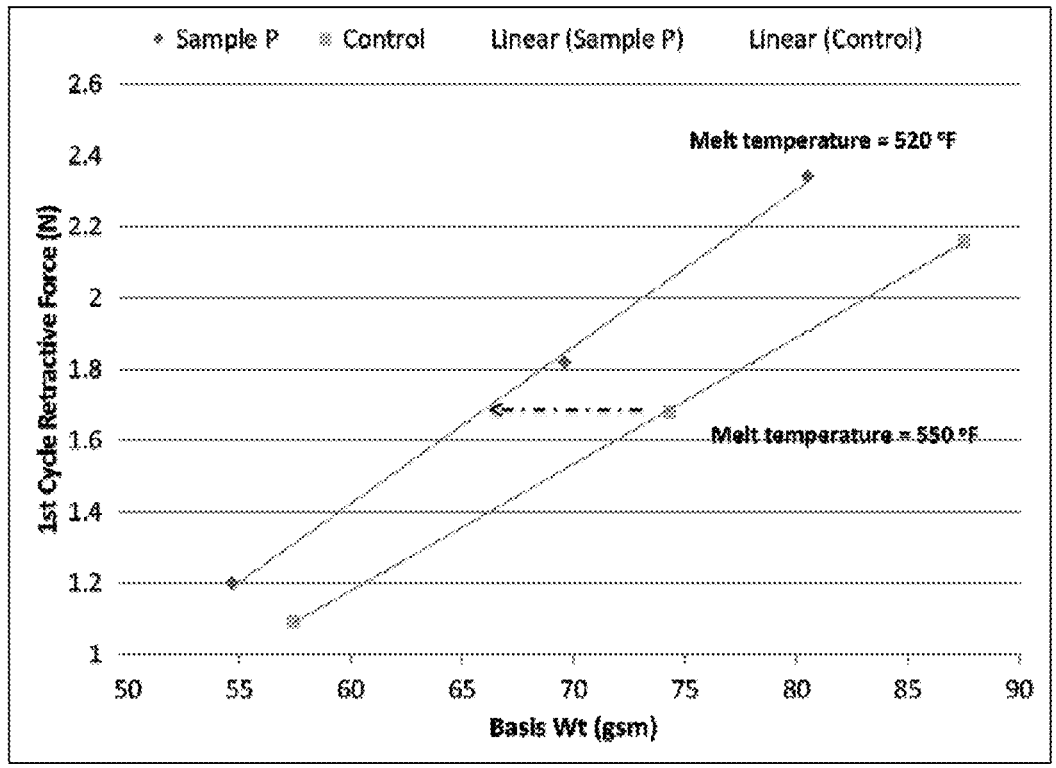
FIG. 12 compares the retractive force and the basis weights for the fabrics of Example 2.

As illustrated in FIG. 11, the permanent set of the fabric decreased as the basis weight of the elastic core increased. When comparing the fabrics made with Sample P to those made with the control, FIG. 11 illustrates that an improved permanent set results at the same basis weight and similar permanent set results at reduced basis weight. Similarly, in FIG. 12 it is seen that the retractive force increased with increasing basis weight. Such results indicate that better retractive force is available at the same basis weight and similar retractive force is available at reduced basis weight for fabrics made with Sample P as compared to fabric made with the control sample.

Having described the various aspects of the compositions herein, further specific embodiments of the invention include those set forth in the following lettered paragraphs:

Embodiment A: A propylene-based polymer composition comprising a reactor blend of a first polymer component and a second polymer component, wherein the first polymer component comprises propylene and ethylene and has an ethylene content $R_1$ of from greater than 12 to less than 19 wt % ethylene, where the percentage by weight is based upon the total weight of the propylene-derived and ethylene-derived units of the first polymer component, wherein the second polymer component comprises propylene and ethylene and has an ethylene content $R_2$ of from greater than 4 to less than 10 wt % ethylene, where the percentage by weight is based upon the total weight of the propylene-derived and ethylene-derived units of the second polymer component, and wherein the ethylene content of the first and second polymer components satisfy the formula:

$$-1.7143R_1+29.771 \leq R_2 \leq -1.9167R_1+37.25.$$

Embodiment B: The propylene-based polymer composition of Embodiment A, wherein the ethylene content of the first and second polymer components satisfy the formula:

$$-1.7143R_1+30 \leq R_2 \leq -1.9167R_1+37.$$

Embodiment C: The propylene-based polymer composition of Embodiment A or B, wherein the ethylene content of the first and second polymer components satisfy the formula:

$$-1.7143R_1+31 \leq R_2 \leq -1.9167R_1+36.$$

Embodiment D: The propylene-based polymer composition of any one of Embodiments A-C, wherein the ethylene content of the first and second polymer components satisfy the formula:

$$-1.7143R_1+32 \leq R_2 \leq -1.9167R_1+35.$$

Embodiment E: The propylene-based polymer composition of any one of Embodiments A-D, wherein the ethylene content of the propylene-based polymer composition is from 5 to 22 wt % ethylene, where the percentage by weight is based upon the total weight of the propylene-derived and ethylene-derived units of the propylene-based polymer composition.

Embodiment F: The propylene-based polymer composition of any one of Embodiments A-E, wherein the ethylene content of the propylene-based polymer composition is from 12 to 18 wt % ethylene, where the percentage by weight is based upon the total weight of the propylene-derived and ethylene-derived units of the propylene-based polymer composition.

Embodiment G: The propylene-based polymer composition of any one of Embodiments A-F, wherein the ethylene content of the propylene-based polymer composition is from 14 to 17 wt % ethylene, where the percentage by weight is based upon the total weight of the propylene-derived and ethylene-derived units of the propylene-based polymer composition.

Embodiment H: The propylene-based polymer composition of any one of Embodiments A-G, wherein the first polymer component has an ethylene content $R_1$ of from greater than 12.5 to less than 17 wt % ethylene.

Embodiment I: The propylene-based polymer composition of any one of Embodiments A-H, wherein the first polymer component has an ethylene content $R_1$ of from 13 to 16 wt % ethylene.

Embodiment J: The propylene-based polymer composition of any one of Embodiments A-I, wherein the second polymer component has an ethylene content $R_2$ of from greater than 6 to less than 9.7 wt % ethylene.

Embodiment K: The propylene-based polymer composition of any one of Embodiments A-J, wherein the second polymer component has an ethylene content $R_2$ of from greater than 7 to less than 9.4 wt % ethylene.

Embodiment L: The propylene-based polymer composition of any one of Embodiments A-K, wherein the MFR of the propylene-based polymer composition is greater than or equal to 30 g/10 min (230° C., 2.16 kg).

Embodiment M: The propylene-based polymer composition of any one of Embodiments A-L, wherein the MFR of the propylene-based polymer composition is greater than or equal to 35 g/10 min (230° C., 2.16 kg).

Embodiment N: The propylene-based polymer composition of any one of Embodiments A-M, wherein the propylene-based polymer composition comprises from 3-25 wt % of the second polymer component and from 75 to 97 wt % of the first polymer component, based on the weight of the propylene-based polymer composition.

Embodiment O: The propylene-based polymer composition of any one of Embodiments A-N, wherein the propylene-based polymer composition comprises from 5-20 wt % of the second polymer component and from 80 to 95 wt % of the first polymer component, based on the weight of the propylene-based polymer composition.

Embodiment P: The propylene-based polymer composition of any one of Embodiments A-O, wherein the propylene-based polymer composition comprises from 7-18 wt % of the second polymer component and from 82 to 93 wt % of the first polymer component, based on the weight of the propylene-based polymer composition.

Embodiment Q: The propylene-based polymer composition of any one of Embodiments A-P, wherein the propylene-based polymer composition comprises from 10 to 15 wt % of the second polymer component and from 85 to 90 wt % of the first polymer component, based on the weight of the propylene-based polymer composition.

Embodiment R: The propylene-based polymer composition of any one of Embodiments A-Q, wherein the propylene-based polymer composition has a triad tacticity greater than about 90%.

Embodiment S: The propylene-based polymer composition of any one of Embodiments A-R, wherein the propylene-based polymer composition has a heat of fusion less than about 50 J/g.

Embodiment T: The propylene-based polymer composition of any one of Embodiments A-S, wherein the propylene-based polymer composition has a melt temperature less than or equal to about 100° C.

Embodiment U: The propylene-based polymer composition of any one of Embodiments A-T, wherein the propylene-based polymer composition has a single DSC melting peak.

Embodiment Z: A meltspun nonwoven composition having at least one elastic layer, wherein the elastic layer comprises the propylene-based polymer composition of any one of Embodiments A-U.

Embodiment AA: A meltspun nonwoven composition having at least one elastic layer, wherein the elastic layer comprises a propylene-based polymer composition, wherein the propylene-based polymer composition is a reactor blend of a first polymer component and a second polymer component, wherein the first polymer component comprises propylene and ethylene and has an ethylene content $R_1$ of from greater than 12 to less than 19 wt % ethylene, where the percentage by weight is based upon the total weight of the propylene-derived and ethylene-derived units of the first polymer component, wherein the second polymer component comprises propylene and ethylene and has an ethylene content $R_2$ of from greater than 4 to less than 10 wt % ethylene, where the percentage by weight is based upon the total weight of the propylene-derived and ethylene-derived units of the second polymer component, and wherein the ethylene content of the first and second polymer components satisfy the formula:

$$-1.7143R_1+29.771 \leq R_2 \leq -1.9167R_1+37.25.$$

Embodiment AB: The meltspun nonwoven composition of Embodiment Z or AA, wherein the meltspun nonwoven composition has a permanent set that is within 1%, or within 0.5%, or equal to, or less than the permanent set of a comparative nonwoven composition and a retractive force that is greater than or equal to the retractive force of a comparative nonwoven composition, where the comparative nonwoven composition is the same as the meltspun nonwoven composition except that the comparative nonwoven composition is made with a propylene-based polymer composition which has a first polymer component that has a decreased ethylene content and a second polymer component has the same ethylene content.

Embodiment AC: The meltspun nonwoven composition of any one of Embodiments Z to AB, wherein the meltspun nonwoven composition has a permanent set that within 1%, or within 0.5%, or equal to, or less than the permanent set of a comparative nonwoven composition and a retractive force that is greater than or equal to the retractive force of a comparative nonwoven composition, where the comparative nonwoven composition is the same as the meltspun nonwoven composition except that the comparative nonwoven composition is made with a propylene-based polymer composition which has a first polymer component that has a increased ethylene content and a second polymer component has the same ethylene content.

Embodiment AD: The meltspun nonwoven composition of any one of Embodiments Z to AC, wherein the meltspun nonwoven composition has a permanent set that is within 1%, or within 0.5%, or equal to, or less than the permanent set of a comparative nonwoven composition and a retractive force that is greater than or equal to the retractive force of a comparative nonwoven composition, where the comparative nonwoven composition is the same as the meltspun nonwoven composition except that the comparative nonwoven composition is made with a propylene-based polymer composition which has a first polymer component that has the same ethylene content and a second polymer component has a decreased ethylene content.

Embodiment AE: The meltspun nonwoven composition of any one of Embodiments Z to AD, wherein the meltspun nonwoven composition has a permanent set that within 1%, or within 0.5%, or equal to, or less the permanent set of a comparative nonwoven composition and a retractive force that is greater than or equal to the retractive force of a comparative nonwoven composition, where the comparative nonwoven composition is the same as the meltspun nonwoven composition except that the comparative nonwoven composition is made with a propylene-based polymer composition which has a first polymer component that has the same ethylene content and a second polymer component has a increased ethylene content.

Embodiment AF: The meltspun nonwoven composition of any one of Embodiments Z to AE, wherein the meltspun nonwoven composition has a permanent set that is within 1%, or within 0.5%, or equal to, or less than the permanent set of a comparative nonwoven composition and a retractive force that is greater than the retractive force of a comparative nonwoven composition, where the comparative nonwoven composition is the same as the meltspun nonwoven composition except that (i) the comparative nonwoven composition is made with a propylene-based polymer composition which has a first polymer component that has a decreased ethylene content and a second polymer component has the same ethylene content; (ii) the comparative nonwoven composition is made with a propylene-based polymer composition which has a first polymer component that has an increased ethylene content and a second polymer component has the same ethylene content; (iii) the comparative nonwoven composition is made with a propylene-based polymer composition which has a first polymer component that has the same ethylene content and a second polymer component has a decreased ethylene content; or (iv) the comparative nonwoven composition is made with a propylene-based polymer composition which has a first polymer component that has the same ethylene content and a second polymer component has an increased ethylene content.

Embodiment AG: The meltspun nonwoven composition of any one of Embodiments Z to AF, wherein the meltspun nonwoven composition has a retractive force, that is greater than or equal to the retractive force of a comparative nonwoven composition and a permanent set that is within 1%, or within 0.5%, or equal to, or less than the permanent set of a comparative nonwoven composition, where the comparative nonwoven composition is the same, except that the comparative nonwoven composition is made with a propylene-based polymer composition that has a (i) first polymer component ethylene content $R_1$ of from less than 12 or greater than 19 wt % ethylene, where the percentage by weight is based upon the total weight of the propylene-derived and ethylene-derived units of the first polymer component, and/or the (ii) a second polymer component ethylene content $R_2$ of less than 4 or greater than 10 wt % ethylene, where the percentage by weight is based upon the total weight of the propylene-derived and ethylene-derived units of the second polymer component.

Embodiment AH: The meltspun nonwoven composition of any one of Embodiments AB to AG, where the retractive force of the meltspun nonwoven composition is 3% greater, or 5% greater, or 10% greater, or 20% greater, than the retractive force of the comparative nonwoven composition.

Embodiment AI: The meltspun nonwoven composition of any one of Embodiments Z to AH, wherein the meltspun nonwoven composition has a $1^{st}$ cycle permanent set of less than 19%.

Embodiment AJ: The meltspun nonwoven composition of any one of Embodiments Z to AI, wherein the meltspun nonwoven composition has a $1^{st}$ cycle permanent set of less than 18%.

Embodiment AK: The meltspun nonwoven composition of any one of Embodiments Z to AJ, wherein the meltspun nonwoven composition has a $2^{nd}$ cycle permanent set less than or equal to about 10%.

Embodiment AL: The meltspun nonwoven composition of any one of Embodiments Z to AJ, wherein the meltspun nonwoven composition has a $1^{st}$ cycle retractive force at 50% recovery greater than about 1.3N.

Embodiment AM: The meltspun nonwoven composition of any one of Embodiments Z to AL, wherein the meltspun nonwoven composition has a $1^{st}$ cycle retractive force at 50% recovery greater than about 1.5N.

Embodiment AN: The meltspun nonwoven composition of any one of Embodiments Z to AM, wherein the meltspun nonwoven composition has a $2^{nd}$ cycle retractive force at 50% recovery greater than about 1.5 N.

Embodiment AO: The meltspun nonwoven composition of any one of Embodiments Z-AN, wherein the nonwoven composition further comprises one or more facing layers.

Embodiment AP: The meltspun nonwoven composition of Embodiment AO, wherein the facing layer comprises fibers of at least one of polypropylene and polyethylene terephthalate.

Embodiment AQ: The meltspun nonwoven composition of Embodiment AO or AP, wherein the facing layer is meltblown, spunbond, spunlace, or carded.

Embodiment AR: The meltspun nonwoven composition of any one of Embodiments AO to AQ wherein the facing layer is an extensible facing layer.

Embodiment AS: The meltspun nonwoven composition of any one of Embodiments AO to AR, wherein the elastic layer is a meltblown layer, and at least one of the facing layers is a spunbond layer.

Embodiment AT: The meltspun nonwoven composition of any one of Embodiments AO to AS, wherein the elastic layer is a meltblown layer positioned between two spunbond facing layers.

Embodiment AU: The meltspun nonwoven composition of any one of Embodiments AT, wherein at least one of the spunbond layers comprises an impact copolymer.

Embodiment AV: An article comprising the meltspun nonwoven composition of any one of Embodiments Z-AU.

Embodiment AW: The article of Embodiment AV, wherein the article is a diaper, feminine care product, adult incontinent product, sterile wrap, isolation gown, operating room gown, surgical gown, surgical drape, first aid dressing, or elastic protective covering.

Embodiment BA: A process for making the meltspun nonwoven composition of any one of Embodiments Z-AW, wherein the process comprises forming a molten polymer composition comprising the propylene-based polymer composition of any one of Embodiments A to U, forming fibers comprising the propylene-based polymer, and forming an elastic layer from the fibers.

Embodiment BB: The process of Embodiment BA, wherein the process further comprises disposing the elastic layer a facing layer.

Embodiment BC: The process of Embodiment BB, wherein the fibers of the elastic layer are formed directly on the facing layer.

Embodiment BD: The process of any one of Embodiments BA to BC, wherein the fibers are formed using a meltblown process at a throughput greater than 0.3 grams per hole per minute ("ghm").

Embodiment BE: The process of any one of Embodiments BA to BD, wherein the fibers are formed using a meltblown process at a die pressure less than or equal to about 3000 psi (20684 kPa).

Embodiment BF: The process of any one of Embodiments BA to BE, wherein the melt temperature of the molten polymer composition is less than or equal to about 575° F. (302° C.).

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

What is claimed is:

1. A propylene-based polymer composition comprising a reactor blend of a first polymer component and a second polymer component,
    wherein the first polymer component comprises propylene and ethylene and has an ethylene content $R_1$ of from greater than 12 to less than 19 wt % ethylene, where the percentage by weight is based upon the total weight of the propylene-derived and ethylene-derived units of the first polymer component,
    wherein the second polymer component comprises propylene and ethylene and has an ethylene content $R_2$ of from greater than 4 to less than 10 wt % ethylene, where the percentage by weight is based upon the total weight of the propylene-derived and ethylene-derived units of the second polymer component,
    wherein the ethylene content of the first and second polymer components satisfy the formula:

$$-1.7143R_1+29.771 \leq R_2 \leq -1.9167R_1+37.25;$$

wherein the MFR of the propylene-based polymer composition is greater than or equal to 30 g/10 min (230° C., 2.16 kg), and
    wherein the propylene-based polymer composition has a single melting peak as measured by DSC that is less than 90° C.

2. The propylene-based polymer composition of claim 1, wherein the ethylene content of the first and second polymer components satisfy the formula:

$$-1.7143R_1+30 \leq R_2 \leq -1.9167R_1+37.$$

3. The propylene-based polymer composition of claim 1, wherein the ethylene content of the first and second polymer components satisfy the formula:

$$-1.7143R_1+31 \leq R_2 \leq -1.9167R_1+36.$$

4. The propylene-based polymer composition of claim 1, wherein the ethylene content of the propylene-based polymer composition is from 5 to 22 wt % ethylene, where the percentage by weight is based upon the total weight of the propylene-derived and ethylene-derived units of the propylene-based polymer composition.

5. The propylene-based polymer composition of claim 1, wherein the first polymer component has an ethylene content $R_1$ of from greater than 12.5 to 16 wt % ethylene.

6. The propylene-based polymer composition of claim 1, wherein the second polymer component has an ethylene content $R_2$ of from greater than 6 to less than 9.7 wt % ethylene.

7. The propylene-based polymer composition of claim 1, wherein the second polymer component has an ethylene content $R_2$ of from greater than 7.2 to less than 9.0 wt % ethylene.

8. The propylene-based polymer composition of claim 1, wherein the MFR of the propylene-based polymer composition is from 40 to 60 g/10 min (230° C., 2.16 kg).

9. The propylene-based polymer composition of claim 1, wherein the propylene-based polymer composition comprises from 3 to 25 wt % of the second polymer component and from 75 to 97 wt % of the first polymer component, based on the weight of the propylene-based polymer composition.

10. The propylene-based polymer composition of claim 1, wherein the propylene-based polymer composition has at least one of: a triad tacticity greater than about 90% and a heat of fusion less than about 50 J/g.

11. A meltspun nonwoven composition having at least one elastic layer, wherein the elastic layer comprises the propylene-based polymer composition of claim 1.

12. A meltspun nonwoven composition having at least one elastic layer, wherein the elastic layer comprises a propylene-based polymer composition,
wherein the propylene-based polymer composition is a reactor blend of a first polymer component and a second polymer component,
wherein the first polymer component comprises propylene and ethylene and has an ethylene content $R_1$ of from greater than 12 to less than 19 wt % ethylene, where the percentage by weight is based upon the total weight of the propylene-derived and ethylene-derived units of the first polymer component,
wherein the second polymer component comprises propylene and ethylene and has an ethylene content $R_2$ of from greater than 4 to less than 10 wt % ethylene, where the percentage by weight is based upon the total weight of the propylene-derived and ethylene-derived units of the second polymer component,
wherein the ethylene content of the first and second polymer components satisfy the formula:

$$-1.7143R_1+29.771 \leq R_2 \leq -1.9167R_1+37.25;$$

wherein the MFR of the propylene-based polymer composition is greater than or equal to 30 g/10 min (230° C., 2.16 kg), and
wherein the propylene-based polymer composition has a single melting peak as measured by DSC that is less than 90° C.

13. The meltspun nonwoven composition of claim 12, wherein the meltspun nonwoven composition has a permanent set that is within 1% of or less than the permanent set of a comparative nonwoven composition and a retractive force that is greater than the retractive force of a comparative nonwoven composition, where the comparative nonwoven composition is the same, except that the comparative nonwoven composition is made with a propylene-based polymer composition that has a (i) first polymer component ethylene content $R_1$ of from less than 12 or greater than 19 wt % ethylene, where the percentage by weight is based upon the total weight of the propylene-derived and ethylene-derived units of the first polymer component, or the (ii) a second polymer component ethylene content $R_2$ of less than 4 or greater than 10 wt % ethylene, where the percentage by weight is based upon the total weight of the propylene-derived and ethylene-derived units of the second polymer component.

14. The meltspun nonwoven composition of claim 12, wherein the meltspun nonwoven composition is formed with a 16" die to collector distance at an air rate of 15 psi and has a $1^{st}$ cycle permanent set of less than 19%.

15. The meltspun nonwoven composition of-claim 12, wherein the meltspun nonwoven composition is formed with a 16" die to collector distance at an air rate of 10 psi and has a $1^{st}$ cycle retractive force at 50% recovery greater than about 1.3N.

16. A process for making a meltspun nonwoven composition comprising:
(i) forming a molten polymer composition comprising a propylene-based polymer composition comprising a reactor blend of a first polymer component and a second polymer component,
wherein the first polymer component comprises propylene and ethylene and has an ethylene content $R_1$ of from greater than 12 to less than 19 wt % ethylene, where the percentage by weight is based upon the total weight of the propylene-derived and ethylene-derived units of the first polymer component,
wherein the second polymer component comprises propylene and ethylene and has an ethylene content $R_2$ of from greater than 4 to less than 10 wt % ethylene, where the percentage by weight is based upon the total weight of the propylene-derived and ethylene-derived units of the second polymer component, and
wherein the ethylene content of the first and second polymer components satisfy the formula:

$$-1.7143R_1+29.771 \leq R_2 \leq -1.9167R_1+37.2,$$

wherein the MFR of the propylene-based polymer composition is greater than or equal to 30 g/10 min (230° C., 2.16 kg), and
wherein the propylene-based polymer composition has a single melting peak as measured by DSC that is less than 90° C.,
(ii) forming fibers comprising the propylene-based polymer, and
(iii) forming an elastic layer from the fibers.

17. The propylene-based polymer composition of claim 1, wherein the polymer composition has an MFR Ratio that is less than 2, wherein the MFR Ratio is determined by dividing the MFR of a fiber extrudate formed from the propylene-based polymer by the MFR of a pellet formed from the propylene-based polymer, and wherein the fiber extrudate is formed at a temperature of 575° F. and at a throughput of 0.51 grams/hole/minute.

18. The propylene-based polymer composition of claim 1, wherein a non-woven formed from the propylene-based polymer composition with a 16" die to collector distance at an air rate of 10 psi has a 1st cycle retractive force at 50% recovery greater than 2.0N.

19. The propylene-based polymer composition of claim 1, wherein a non-woven formed from the propylene-based polymer composition with a 16" die to collector distance at an air rate of 15 psi has a 1st cycle permanent set of less than 19%.

20. The propylene-based polymer composition of claim 1, wherein a non-woven formed from the propylene-based polymer composition with a 16" die to collector distance at an air rate of 15 psi has a 1st cycle retractive force at 50% recovery greater than 2.0N and a 1st cycle permanent set of less than 19%.

21. The propylene-based polymer composition of claim 1, wherein the propylene-based polymer composition has a tacticity index m/r of from 4 to 12.

22. A propylene-based polymer composition comprising a reactor blend of a first polymer component and a second polymer component,
- wherein the first polymer component comprises propylene and ethylene and has an ethylene content $R_1$ of from greater than 12 to less than 19 wt % ethylene, where the percentage by weight is based upon the total weight of the propylene-derived and ethylene-derived units of the first polymer component,
- wherein the second polymer component comprises propylene and ethylene and has an ethylene content $R_2$ of from greater than 4 to less than 10 wt % ethylene, where the percentage by weight is based upon the total weight of the propylene-derived and ethylene-derived units of the second polymer component,
- wherein the ethylene content of the first and second polymer components satisfy the formula:

$-1.7143R_1+29.771 \leq R_2 \leq -1.9167R_1+37.25;$

- wherein the MFR of the propylene-based polymer composition is greater than or equal to 30 g/10 min (230° C., 2.16 kg), and wherein the propylene-based polymer composition has a single melting peak as measured by DSC that is from 50° C. to less than 70° C.

23. The propylene-based polymer composition of claim 1, wherein:
- the first polymer component has an ethylene content $R_1$ of from greater than 12.5 to less than 15.2 wt % ethylene,
- the second polymer component has an ethylene content $R_2$ of from greater than 6.2 to less than 9.0 wt % ethylene, and
- the propylene-based polymer composition has a single melting peak as measured by DSC that is from 50° C. to less than 70° C.

24. The propylene-based polymer composition of claim 1, wherein the propylene-based polymer composition has a single melting peak as measured by DSC that is from 25° C. to less than 90° C.

25. The meltspun nonwoven composition of claim 12, wherein the propylene-based polymer composition has a single melting peak as measured by DSC that is from 25° C. to less than 90° C.

26. The process of claim 16, wherein the propylene-based polymer composition has a single melting peak as measured by DSC that is from 25° C. to less than 90° C.

* * * * *